(12) United States Patent
Farrahi Moghaddam et al.

(10) Patent No.: US 11,296,522 B2
(45) Date of Patent: Apr. 5, 2022

(54) STACKABLE AUTOMATED DRONE CHARGING STATION

(71) Applicant: Telefonaktiebolaget LM Ericsson (publ), Stockholm (SE)

(72) Inventors: Fereydoun Farrahi Moghaddam, Brossard (CA); Reza Farrahi Moghaddam, Brossard (CA); Yves Lemieux, Kirkland (CA); Denis Monette, Coteau de Lac (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 380 days.

(21) Appl. No.: 16/344,590

(22) PCT Filed: Oct. 28, 2016

(86) PCT No.: PCT/IB2016/056535
§ 371 (c)(1),
(2) Date: Apr. 24, 2019

(87) PCT Pub. No.: WO2018/078424
PCT Pub. Date: May 3, 2018

(65) Prior Publication Data
US 2019/0245365 A1    Aug. 8, 2019

(51) Int. Cl.
*H02J 7/00*      (2006.01)
*B60L 53/30*     (2019.01)
(Continued)

(52) U.S. Cl.
CPC ............ *H02J 7/0044* (2013.01); *B60L 53/12* (2019.02); *B60L 53/14* (2019.02); *B60L 53/30* (2019.02);
(Continued)

(58) Field of Classification Search
CPC ...... H02J 7/0044; B64C 39/024; B60L 53/14; B60L 53/30; B60L 2200/10
(Continued)

(56) References Cited

U.S. PATENT DOCUMENTS 7,398,946 B1   7/2008  Marshall
8,265,808 B2   9/2012  Garrec et al.
(Continued)

FOREIGN PATENT DOCUMENTS

EP    2 942 688 A1    11/2015
KR    101 599 423 B1    3/2016
(Continued)

OTHER PUBLICATIONS

Office Action dated Feb. 1, 2021 issued in U.S. Appl. No. 16/343,597, consisting of 24 pages.
(Continued)

*Primary Examiner* — Richard V Muralidar
(74) *Attorney, Agent, or Firm* — Christopher & Weisberg, P.A.

(57) ABSTRACT

A drone charging station configured to charge at least one drone, the charging station including at least one charging stack comprised of a plurality of base blocks, the at least one charging stack including a first conductor block having a first polarity for electrically engaging with a corresponding first electrode of the at least one drone, and a first drone guiding portion, a second conductor block having a second polarity different from the first polarity for electrically engaging with a corresponding second electrode of the at least one drone, the second conductor block having a second drone guiding portion, and an insulator block positioned between the first conductor block and the second conductor block and having a third drone guiding portion. The first drone guiding portion, the second drone guiding portion and
(Continued)

the third drone guiding portion arranged to provide a drone guiding path along the charging stack.

28 Claims, 10 Drawing Sheets

(51) Int. Cl.
    *H02J 50/12*     (2016.01)
    *B60L 53/12*     (2019.01)
    *B60L 53/14*     (2019.01)
    *B64F 1/36*      (2017.01)
    *H02J 7/02*      (2016.01)
    *B64C 39/02*     (2006.01)

(52) U.S. Cl.
    CPC ............ *B64C 39/024* (2013.01); *B64F 1/362* (2013.01); *H02J 7/00* (2013.01); *H02J 7/0018* (2013.01); *H02J 7/0027* (2013.01); *H02J 7/0042* (2013.01); *H02J 7/0045* (2013.01); *H02J 7/025* (2013.01); *H02J 50/12* (2016.02); *B60L 2200/10* (2013.01); *B64C 2201/066* (2013.01)

(58) Field of Classification Search
    USPC .......................................................... 320/109
    See application file for complete search history.

(56) References Cited

U.S. PATENT DOCUMENTS

| | | |
|---|---|---|
| 8,751,061 B2 | 6/2014 | Coulmeau et al. |
| 8,963,488 B2 | 2/2015 | Campanella et al. |
| 8,989,922 B2 | 3/2015 | Jones et al. |
| 9,387,928 B1 | 7/2016 | Gentry et al. |
| 9,412,279 B2 | 8/2016 | Kantor et al. |
| 9,527,605 B1* | 12/2016 | Gentry ................ G05D 1/0094 |
| 9,845,165 B2 | 12/2017 | Michalski et al. |
| 9,957,045 B1 | 5/2018 | Daly |
| 10,351,261 B1 | 7/2019 | Bryant |
| 10,467,685 B1 | 11/2019 | Brisson et al. |
| 10,614,515 B1 | 4/2020 | Brisson et al. |
| 2005/0218880 A1 | 10/2005 | Ioffe |
| 2013/0125778 A1 | 5/2013 | LaCabe |
| 2016/0001883 A1 | 1/2016 | Sanz et al. |
| 2016/0016663 A1 | 1/2016 | Stanek et al. |
| 2016/0083115 A1 | 3/2016 | Hess |
| 2016/0107750 A1 | 4/2016 | Yates |
| 2016/0137304 A1 | 5/2016 | Phan et al. |
| 2016/0144958 A1 | 5/2016 | Woodworth et al. |
| 2016/0159496 A1 | 6/2016 | O'Toole |
| 2016/0311329 A1 | 10/2016 | Rodriguez |
| 2016/0376031 A1 | 12/2016 | Michalski et al. |
| 2017/0175413 A1* | 6/2017 | Curlander ................ B64F 1/10 |
| 2018/0196418 A1 | 7/2018 | Meier et al. |
| 2018/0370654 A1 | 12/2018 | Cantrell et al. |
| 2019/0245365 A1 | 8/2019 | Moghaddam et al. |
| 2020/0052512 A1 | 2/2020 | Moghaddam et al. |
| 2020/0130510 A1 | 4/2020 | Eck et al. |
| 2020/0167722 A1 | 5/2020 | Goldberg |
| 2020/0310466 A1 | 10/2020 | Fischer |

FOREIGN PATENT DOCUMENTS

| | | |
|---|---|---|
| WO | 2015/150529 A1 | 10/2015 |
| WO | 2016/012437 A1 | 1/2016 |
| WO | 2016/137982 A1 | 9/2016 |

OTHER PUBLICATIONS

European Search Report dated Feb. 18, 2020 issued in corresponding European Patent Application No. 16 794 063.4, consisting of 6 pages.
International Search Report and Written Opinion of the International Searching Authority dated Feb. 2, 2018 issued in PCT Application No. PCT/IB2017/056701, consisting of 8 pages.
International Search Report and Written Opinion of the International Searching Authority dated Jul. 14, 2017 issued in PCT Application No. PCT/IB2016/056535, consisting of 13 pages.

* cited by examiner

STACKABLE AUTOMATED DRONE CHARGING STATION

CROSS-REFERENCE TO RELATED APPLICATIONS

This application is a Submission Under 35 U.S.C. § 371 for U.S. National Stage Patent Application of International Application Number: PCT/IB2016/056535, filed Oct. 28, 2016 entitled "STACKABLE AUTOMATED DRONE CHARGING STATION," the entirety of which is incorporated herein by reference.

TECHNICAL FIELD

The present disclosure relates to drone charging systems, and in particular, to a stackable, modular, drone charging station that is configured to charge multiple drones at the same.

BACKGROUND

When designing a drone charging system, a number of design constraints must be considered. For example, there are strict constraints on the size, weight and battery capacity that a drone can have. These constraints will, in turn, affect the size and structure of the drone charging station. Thus, a large drone charging station may provide difficulties if space is limited. Further, current drone charging systems require manual intervention during the charging process. Thus, in addition to space constraints being a consideration, manpower constraints must also be considered when designing an optimal drone charging station.

Drone charging stations are typically designed to charge a single drone at a time. Existing charging stations are often not equipped to handle simultaneous charging of drones. However, scenarios often arise where more than one drone in the area near a charging station needs to be charged. A charging station that charges a first drone while other nearby drones have to wait until the first drone is fully charged, is impractical and inefficient. The waiting drones are not being used and are using up energy in the waiting process. Alternately, the waiting drones could search for an alternate charging station. There may not be a station close by or the process of searching for a nearby charging station might put excess strain on the drone's battery capacity.

In instances where a charging station may have multiple charging pads to accept multiple drones, the result is a drone charging station with a huge footprint, making it impractical for use at charging facilities with limited available space.

SUMMARY

The present disclosure advantageously provides a drone charging station and a system for charging at least one drone. According to one aspect of the disclosure a drone charging station configured to charge at least one drone, is provided. The drone charging station includes at least one charging stack comprised of a plurality of blocks, each of the plurality of blocks sized to engage with the at least one drone, the at least one charging stack including a first conductor block having a first polarity for electrically engaging with a corresponding first electrode of the at least one drone, the first conductor block having a first drone guiding portion, a second conductor block having a second polarity different from the first polarity for electrically engaging with a corresponding second electrode of the at least one drone, the second conductor block having a second drone guiding portion, and an insulator block positioned between the first conductor block and the second conductor block, the insulator block having a third drone guiding portion. The first drone guiding portion, the second drone guiding portion and the third drone guiding portion being arranged to provide a drone guiding path along the at least one charging stack.

According to one embodiment of this aspect, the first drone guiding portion comprises a first thread, the second drone guiding portion comprises a second thread, and the third drone guiding portion comprises a third thread, and wherein the drone guiding path comprises a continuous drone guiding thread formed by an arrangement of the first thread, the second thread and the third thread. According to another embodiment of this aspect, the arrangement includes a starting point of the third thread being positioned proximate an ending point of the first thread and a starting point of the second thread being positioned proximate an ending point of the third thread. According to another embodiment of this aspect, the first drone guiding portion comprises a first plurality of pins, the second drone guiding portion comprises a second plurality of pins, and the third drone guiding portion comprises a third plurality of pins, and wherein the drone guiding path is formed by an arrangement of the first plurality of pins, the second plurality of pins and the third plurality of pins.

According to another embodiment of this aspect, the drone charging station is configured to charge a plurality of drones at the same time. According to another embodiment of this aspect, the drone charging station further includes an accessory block having an end affixed to an end of one of the at least one charging stack, the accessory block being tapered toward the end opposite the end affixed to the end of one of the at least one charging stack. According to another embodiment of this aspect, the drone charging station further includes a plurality of charging stacks resulting in a plurality of first conductor blocks, a plurality of second conductor blocks and a plurality of insulator blocks, the drone charging station further including:

an alignment element configured to align each of the plurality of first conductor blocks, second conductor blocks and insulator blocks to form a cylinder, a first conductor couple, the first conductor coupler electrically coupling each of the plurality of first conductor blocks together, the first conductor coupler being electrically conductive, and a second conductor coupler, the second conductor coupler electrically coupling each of the plurality of second conductor blocks together, the second conductor coupler being electrically conductive.

According to another embodiment of this aspect, the drone charging station includes an insulator coupler, the insulator coupler coupling each of the plurality of the insulator blocks together. According to another embodiment of this aspect, each of the plurality of first conductor blocks, second conductor blocks, and insulator blocks include an alignment tab extending within an interior of the cylinder, the alignment tab including at least an alignment aperture sized to receive the alignment element. According to another embodiment of this aspect, each of the plurality of blocks includes a first end having a first engagement element and a second end having a second engagement element, the first end opposite the second end, wherein the first engagement element is matable with the second engagement element of an adjacent block to prevent rotational misalignment. According to another embodiment of this aspect, the drone guiding path is formed along an exterior of the at least one charging stack.

According to another embodiment of this aspect, the drone charging station further includes at least one insulator stack, the at least one insulator stack comprising at least one insulator block, the at least one insulator stack positioned between one of the at least one charging stack and a second charging stack. According to another embodiment of this aspect, the drone charging station further include at least one motor configured to enable the at least one charging stack to rotate, and a rotation inhibitor to inhibit rotation of the at least one drone when the at least one drone contacts the drone charging station, the at least one drone traveling along the drone guiding path due to the rotation of the at least one charging stack. According to another embodiment of this aspect, the insulator block comprises a plurality of separate insulator members. According to another embodiment of this aspect, the drone charging station further includes a third conductor block for electrically engaging with a corresponding electrode of the at least one drone, and a second insulator block positioned between one of the first conductor block and the third conductor block and the second conductor block and the third conductor block the third conductor block configured to provide data transmission to the at least one drone.

According to another aspect of the disclosure, a drone charging station configured to charge at least one drone is provided. The drone charging station includes at least one hollow charging tube comprised of a plurality of interior blocks, each of the plurality of interior blocks sized to engage with the at least one drone, the at least one hollow charging tube including a first interior conductor block having a first polarity for electrically engaging with a corresponding first electrode of the at least one drone, the first interior conductor block having a first drone guiding portion, a second interior conductor block having a second polarity different from the first polarity for electrically engaging with a corresponding second electrode of the at least one drone, the second interior conductor block having a second drone guiding portion, and an interior insulator block positioned between the first interior conductor block and the second interior conductor block, the interior insulator block having a third drone guiding portion. The first drone guiding portion, the second drone guiding portion and the third drone guiding portion being arranged to provide a drone guiding path along an interior of the at least one hollow charging tube.

According to an embodiment of this aspect, the first drone guiding portion comprises a first thread, the second drone guiding portion comprises a second thread, and the third drone guiding portion comprises a third thread, and wherein the drone guiding path comprises a continuous drone guiding thread formed by an arrangement of the first thread, the second thread and the third thread. According to an embodiment of this aspect, the arrangement includes a starting point of the third thread being positioned proximate an ending point of the first thread and a starting point of the second thread being positioned proximate an ending point of the third thread. According to an embodiment of this aspect, the first drone guiding portion comprises a first plurality of pins, the second drone guiding portion comprises a second plurality of pins, and the third drone guiding portion comprises a third plurality of pins, and wherein the drone guiding path is formed by an arrangement of the first plurality of pins, the second plurality of pins and the third plurality of pins.

According to an embodiment of this aspect, the drone charging station is configured to charge a plurality of drones at the same time. According to an embodiment of this aspect, the drone charging station further includes an accessory block having an end affixed to an end of one of the at least one hollow charging tube, the accessory block being tapered toward the end opposite the end affixed to the end of one of the at least hollow charging tube. According to an embodiment of this aspect, the drone charging station further includes a plurality of hollow charging tubes resulting in a plurality of first interior conductor blocks, a plurality of second interior conductor blocks and a plurality of interior insulator blocks. The drone charging station further includes an alignment element configured to align each of the plurality of first interior conductor blocks, second interior conductor blocks and interior insulator blocks to form a cylinder, a first conductor coupler, the first conductor coupler electrically coupling each of the plurality of first interior conductor blocks together, the first conductor coupler being electrically conductive, and a second conductor coupler, the second conductor coupler electrically coupling each of the plurality of second interior conductor blocks together, the second conductor coupler being electrically conductive.

According to an embodiment of this aspect, the drone charging station further includes an insulator coupler, the insulator coupler coupling each of the plurality of interior insulator blocks together. According to an embodiment of this aspect, each of the plurality of first interior conductor blocks, second interior conductor blocks, and interior insulator blocks include an alignment tab extending outside of the cylinder, the alignment tab including an aperture sized to receive the alignment element. According to an embodiment of this aspect, each of the plurality of blocks comprises a first end having a first engagement element and a second end having a second engagement element, the first end opposite the second end, wherein the first engagement element is matable with the second engagement element of an adjacent block to prevent rotational misalignment.

According to an embodiment of this aspect, the drone charging station further includes at least one insulator layer, the at least one insulator layer comprising at least one insulator block, the at least one insulator layer positioned between one of the at least one charging hollow tube and a second hollow charging tube. According to an embodiment of this aspect, the drone charging station further includes at least one motor configured to enable the at least one hollow charging tube to rotate, and a rotation inhibitor to inhibit rotation of the at least one drone when the at least one drone enters the drone charging station, the at least one drone traveling along the drone guiding path due to the rotation of the at least one hollow charging tube.

According to another aspect of the disclosure, a system for charging at least one drone is provided. The system includes at least one drone, each of the at least one drone including a first electrode for electrically engaging with a corresponding first conductor block in the drone charging station, the first electrode including a first guiding region, a second electrode for electrically engaging with a corresponding second conductor block in the drone charging station, the second electrode including a second guiding region, and an insulator, the insulator including a third guiding region. The system further including a guiding system comprising at least a portion of the first guiding region, the second guiding region, and the third guiding region, the guiding system configured to engage a corresponding guiding region of the drone charging station in order provide a drone guiding path along the drone charging station.

According to an embodiment of this aspect, the first guiding region, the second guiding region, and the third guiding region are recesses, each of the recesses configured to engage a corresponding thread of the drone charging station. According to an embodiment of this aspect, the drone guiding path is along an exterior of the drone charging station. According to an embodiment of this aspect, each of the at least one drone further comprises a mounting aperture configured to allow the at least one drone to travel past a mounting arm that affixes the drone charging station to a surface.

According to an embodiment of this aspect, each of the at least one drone comprises a receiving region sized to receive an outer perimeter of the drone charging station. According to an embodiment of this aspect, the first guiding region, the second guiding region, and the third guiding region being disposed within at least a portion of the receiving region. According to an embodiment of this aspect, each of the at least one drone is sized to fit within an interior of the drone charging station, and wherein the first electrode, the second electrode, and the insulator portion are each disposed along an exterior region of the at least one drone, the drone guiding path being formed along an interior surface of the drone charging station.

According to another aspect of the disclosure, a drone docking station configured to receive at least one drone is provided. The docking station includes a docking shaft sized to engage with the at least one drone, the docking shaft having a drone entrance end and a drone exit end opposite the drone entrance end, and a drone guiding thread helically encircling an exterior portion of the elongated docking shaft, the drone guiding thread configured to engage with a corresponding guiding region on the at least one drone to allow the at least drone to move along the drone guiding thread from the drone entrance end to the drone exit end.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
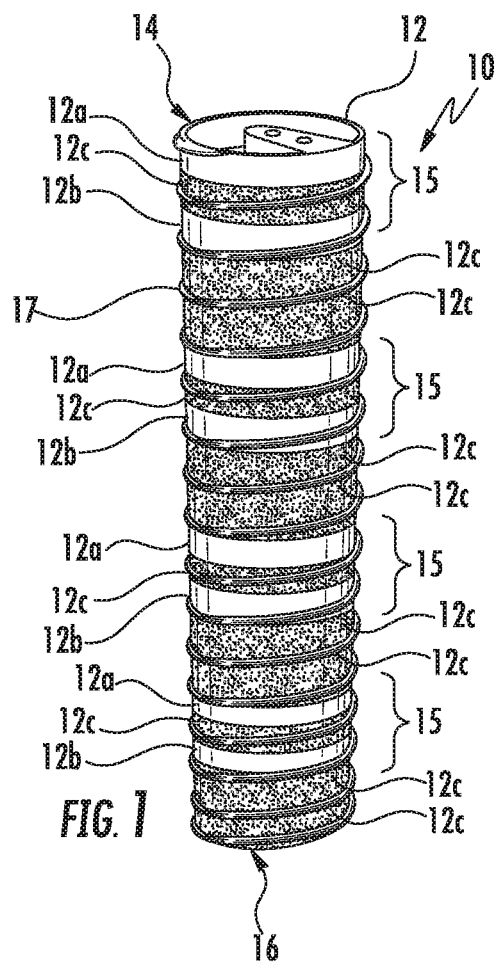
FIG. 1 is a front perspective view a drone charging station, in accordance with the principles of the present disclosure.

Before describing in detail exemplary embodiments, it is noted that the embodiments reside primarily in combinations of apparatus components and processing steps related to a drone charging station that can charge one or more drones at the same time. In one embodiment, the proposed drone charging station has no movable parts and occupies a small footprint due to its cylindrical design. In one embodiment, the drone charging station includes stackable base blocks that are uniform in shape to allow for a cylinder of multiple base blocks to be created by stacking base blocks upon each other. In one embodiment, the charging of multiple drones can occur in a first-in first-out arrangement where drones enter the charging station at one end and exit at the opposite end. The stack of base blocks can be of such a size to receive and charge multiple drones simultaneously. The uniformly-shaped blocks can be disassembled and reused for creation of a new drone charging station, for example, at a different location. The drone charging station of the present disclosure also includes a controller that can facilitate operations of the drone and the drone charging station.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, the drone charging station of the present disclosure advantageously provides a stackable set of base blocks where one or more drones can enter the charging station and be stacked on top of each other or situated on the charging station very near each other while charging. Without this features, a large amount of space must be reserved for a large drone station or multiple drone stations must be maintained in order to separately charge multiple drones.

In some embodiments, the drone charging station can be mounted to a surface such as a wall or ceiling which minimizes unintentional impact on the charging station. The mounting feature also helps to minimize the overall footprint of the charging station.

In some embodiments, the drone charging station provides a stack of base blocks, including conductor and insulator blocks, resulting in a charging station without movable parts and without any additional electrical parts needed to engage and charge the drones. This results in a less complex and less expensive drone charging station which is less prone to failure.

In some embodiments, guiding/landing logic is used to enable the drone(s) to seamlessly approach the charging station, engage, charge, and then leave the charging station.

In some embodiments, the drone charging station forms a cylindrical stack formed of uniformly-shaped base blocks. The shape of each base block is the same with the only difference being whether some base blocks are conductor (i.e., metal) blocks while other base blocks are insulator (i.e., plastic) blocks. Because the overall design and shape of the structure of each block is the same, the design, manufacture, and mass production of the drone charging station is efficient and cost-effective. Further, the charging station blocks are re-usable, and the stack can be broken down and reassembled for additional use, for example, at a different location.

In some embodiments, the drone charging station provides a first-in-first-out (FIFO) feature, which enables drones that enter the stack at one end to remain on the stack till fully charged before exiting at an opposite end of the stack. Thus, the drones exit the drone charging station in the same order that they entered.

In some embodiments, the ability of the drone charging station to receive and charge multiple drones at the same time allows for a swarm or platoon of drones to be charged and used for specifically-controlled tasks.

Referring now to the drawings, in which like reference designators refer to like elements, there is shown in FIGS. 1-18, an exemplary drone charging station, and its related components, constructed in accordance with the principles of the present disclosure and designated generally as "10." Referring to FIG. 1, charging station 10 may include one or more base blocks 12. In one embodiment, base blocks 12 are of uniform shape and size and may be configured to stack upon each other to form a cylindrically-shaped stack of the kind shown in FIG. 1. Each base block 12 (base blocks 12a, 12b and 12c are referred to collectively as base blocks 12) is sized to engage one or more drones. There are no restrictions to the number of base blocks that may be used to form the stack of drone charging station 10 so a stack of base blocks may be formed of any height based on the number of drones to be simultaneously charged. As used herein, "base block 12" shall refer to the base blocks of drone charging station 10 without regard to whether the base block is a conductor block or an insulator block.

In one embodiment, there are three different types of base blocks 12 that form charging station 10. A first conductor block 12a is a block made of a conductive material such as metal, and has a first polarity, such as positive (+). The first conductor block 12a electrically engages with a corresponding electrode of the same polarity (i.e., positive) of a drone that has entered charging station 10. A second conductor block 12b is also formed of conductive material such as metal. For charging purposes, conductor block 12b has a second polarity different from the first polarity, i.e., negative (−). In other words, conductor block 12a and conductor block 12b can be fabricated of the same material. In operation, conductor block 12b is electrically connected to a polarity opposite the polarity of conductor block 12a in order to create an electrical drone charging circuit. In operation, the second conductor block 12b electrically engages with a corresponding electrode of the same polarity (i.e., negative) of the drone that has entered drone charging station 10. A third type of base block 12 is an insulator block 12c which is formed of an insulator material such as plastic. It is understood that conductor blocks 12a and 12b do not have to be fabricated entirely of a conductive material such as a metal. Rather, blocks 12a and 12b can be fabricated of any suitable material as long as there is a conductive portion on the exterior to electrically couple with a drone, and so that there is an electrically conductive pathway from the electrical supply to the conductive exterior of the block 12a and 12b.

One or more insulator blocks 12c are situated in between and therefore separate first conductor block 12a and second conductor block 12b. This allows two poles of an electricity source to be connected to two different conductor blocks, e.g., conductor blocks 12a and 12b, which are isolated from each other by an insulator bloc 12ck. An arrangement of a first conductor block 12a/second conductor block 12b/insulator block 12c is referred to herein as a charging stack 15. In the embodiment shown in FIG. 1, drone charging station 10 includes four separate charging stacks 15. The drone charging station 10 of the present disclosure is not limited to any specific number charging stacks 15.

One or more drones may enter the drone charging station 10 either from a first end 14 or a second end 16 and travel from one end of the charging station 10 to another end. During the movement of the drone up (or down) the stack of conductor blocks (12a and 12b), the drone is charged due to the engagement of the drone's electrodes with a corresponding conductor block of similar polarity of charging station 10. The insulator blocks 12c situated in between the charging stacks 15 serve to delay the charging of the drones as they travel along the stack and also to provide separation between a conductive block 12 in one charging stack 15 and a conductive block 12 in an adjacent charging stack 15. In other words, in one embodiment, the insulator blocks 12c between charging stacks 15 are used to ensure that a drone is only charged within a charging stack 15 and not while spanning different charging stacks 15. In other words, since a drone is not charged when in contact with an insulator block 12c, design constraints are considered in dictating the number of insulator blocks 12c that are used to separate charging stack 15 arrangements. Depending on the drone's battery level and other factors such as the strength of the conductors, size of the drones, and/or size and length of the stack of base blocks 12, a different number of insulator blocks 12c may be used to separate the charging stacks 15, and thus although FIG. 1 illustrates the use of two insulator blocks 12c between each charging stack 15, the present disclosure is not limited to a particular number of insulator stacks 12c used.

The arrangement of first conductor blocks 12a, second conductor blocks 12b, and insulator blocks 12c, are such that a drone that enters charging station 10 at one end, for example, first end 14, and rotatably moves down the stacked blocks 12 of charging station 10 towards the opposite end, for example, second end 16, exits charging station 10 at second end 16 being fully charged or charged to a desired level. Thus, in the illustrative embodiment of FIG. 1, drone charging station 10 may host and simultaneously charge up to four drones. As one drone exits charging station 10, charged, and as the three drones travel down the stack of base blocks 12, a new drone may enter drone charging station 10. Thus, in this continuous fashion, drones may continuously enter drone charging station 10 at one end, e.g., first end 14, move down the stack of base blocks 12, obtaining charge along the way, and exit at second end 16 with a desired charge level. The speed at which the drones proceed along the charging station 10 can establish the charging level. Once the top charging stack 15 is free of drones, i.e., with the drone that occupied the top charging stack 15 having moved to the next charging stack 15, a new drone can enter drone charging station 10 at the top charging stack 15 and begin its charging process in the manner described above. As will be discussed below, a controller can be used to control the movement of the drones in such a fashion that charging station 10 can receive and charge the maximum or optimal number of drones without the drones colliding and achieving a desired charge level. As will also be discussed in greater detail below, each base block 12 has a guiding portion such that when the base blocks 12 are stacked in the arrangement of FIG. 1, a drone guiding path 17 is formed around the exterior surface of drone charging station 10. It is the drone guiding path 17 that engages with a corresponding guiding region of the drones, allowing the drones to make their way down, or up, the drone charging station 10. In one embodiment, drone guiding path 17 is in the form of a continuous helical thread from one end of drone charging station 10 to its opposite end.

Figure 2:
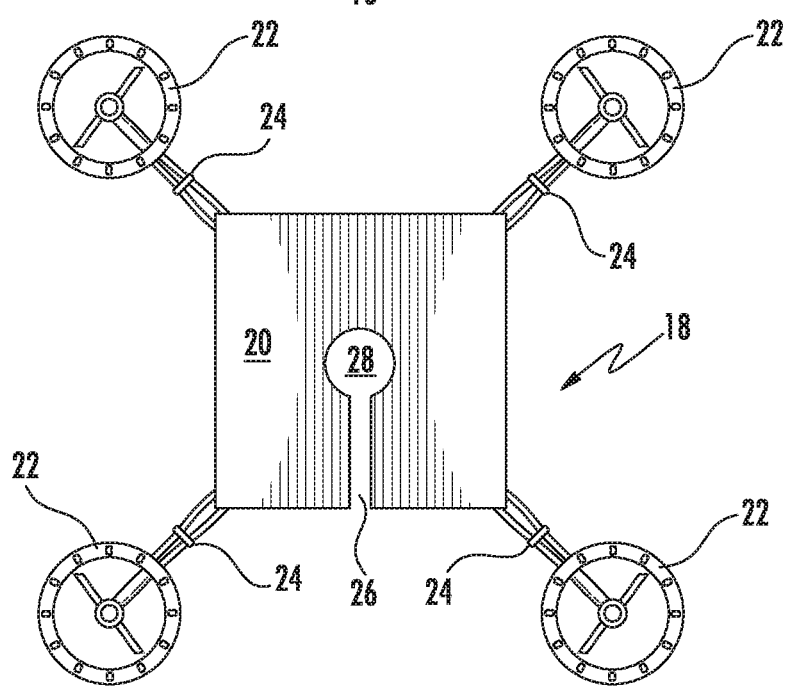
FIG. 2 is a top view of a drone that is to be charged by the drone charging station in accordance with the principles of the present disclosure.

FIG. 2 is a top view of a drone 18 that may be charged by drone charging station 10. Drone 18 includes a center portion 20, four propellers 22, each extending from center portion 20 by an attachment member 24. The attachment members 24 may be rotatable, and/or movable up/down or left/right to accommodate areas of the drone's flight that might require a smaller drone footprint. Drone 18 includes a mounting aperture 26 configured to allow drone 18 to travel past a mounting mechanism that affixes drone charging station 10 to a surface, as discussed in further detail below. Mounting aperture 26 can be sized and configured to accommodate differently sized charging station mounting mechanisms. Drone 18 also includes a receiving region 28 sized to receive an outer perimeter of drone charging station 10. Similarly, receiving region 28 may be configured in size and shape according to the size and shape of the base blocks 12 of drone charging station 10. Base blocks 12 having a larger diameter will result in the receiving region 28 having a larger diameter in order to fit around and engage the base blocks 12 of drone charging station 10. Although receiving region 28 shown in FIG. 2 is centrally located in center portion 20 of drone 18, it is within the scope of the present disclosure that receiving region 28 can be located off-center, i.e., closer to one of the side edges of center portion 20, and need not be located in the orientation depicted in FIG. 2.

As is shown in different figures and discussed in greater detail below, each drone 18 includes a first electrode and a second electrode, where the first and second electrodes are engageable with corresponding conductor blocks of drone charging station 10 of identical polarity. The electrodes of drone 18 are disposed in layers at least partially around receiving region 28 such that as drone 18 enters charging station 10 and begins to wind its way along (from one end to the opposite end) the stack of base blocks 12, an electrode of, for example, positive polarity, that is at least partially exposed along receiving region 28 contacts a corresponding first conductor block 12a of identical polarity and will receive a charge. Similarly, an electrode of negative polarity at least partially exposed along receiving region 28 receives a charge from second conductor block 12b as drone 18 winds its way along (from one end to the opposite end) drone charging station 10. In this fashion, the electrodes of drone 18 are fully charged by the time drone 18 exits charging station 10.

As also will be discussed in greater detail below, drone 18 includes an arrangement of guiding regions in the form of, for example, inner recesses, nut threads, or grooves disposed at least partially along receiving region 28. These inner recesses or grooves are configured to receive drone guiding path 17 that is formed along the outer surface of drone charging station 10. In this fashion, as drone 18 rotates and moves from one end of drone charging station 10, for example, first end 14, to the opposite end, for example end 16, it is charged in the fashion described above. The interaction of drone guiding path 17 and the drone's guiding region operates like a screw having outer threads (i.e., drone guiding path 17) and a nut having corresponding inner threads (i.e., the drone's guiding region) to allow drone 18 to travel along drone guiding path 17.

Figure 3:
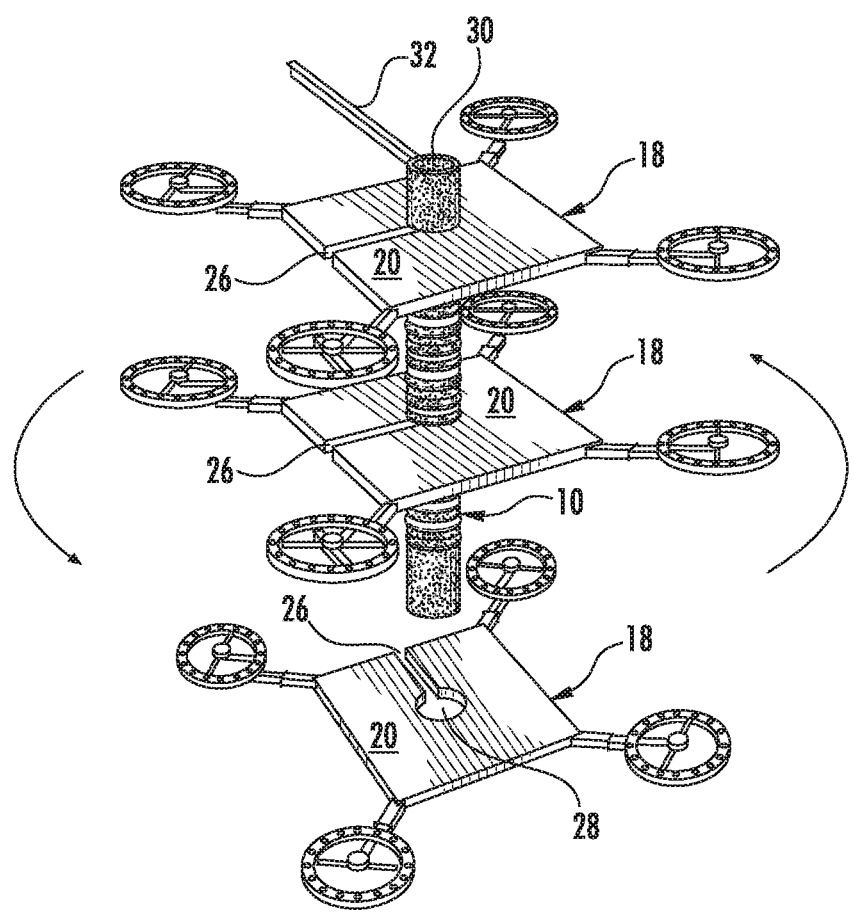
FIG. 3 is a perspective view of multiple drones being received by the charging stack at the same time and charged in accordance with the principles of the present disclosure.

FIG. 3 illustrates an embodiment of the present disclosure where a plurality of drones 18 interact with drone charging station 10 at the same time. As shown, two drones 18 are engaged with drone charging station 10 and are being charged at the same time, while a third drone 18, after having been fully charged, exits drone charging station 10, having helically wound their way along drone guiding path from one end to the opposite end of drone charging station 10. As shown, receiving region 28 of each drone 18 engages with the stack of base blocks 12 of drone charging station 10. Due to the arrangement of drone guiding path 17 and the interaction of drone guiding path 17 with the interior guiding region of each drone 18, each drone 18 rotates in the direction of the arrows and works its way down drone charging station 10. The direction of rotation shown in FIG. 3 is exemplary only and the drones may rotate in the opposite direction, based on the orientation of drone guiding path 17. In other words, it is contemplated that drones 18 can proceed through the charging station 10 from bottom to top, left to right, right to left, etc.

As discussed above, positive electrodes of drone 18 are coupled with corresponding first conductor blocks 12a and negative electrodes are coupled with corresponding second conductor blocks 12b. The number of charging stacks 15 and insulator blocks 12c between each charging stack 15 is selected in such a fashion that each drone 18 is fully charged when it exits drone charging station 10. The insertion of one or more insulator blocks 12c between each charging stack 15 serves to time and delay the charging effect and separate the drones 18 such that one drone 18 can engage with drone charging station 10 at the same time without hitting or dislodging adjacent drones 18 and to maintain electrical connectivity for charging within a single charging stack 15 and not across multiple charging stacks 15. The result is a drone charging station 10 that provides a first-in-first-out (FIFO) feature, which enables drones 18 that enter drone charging station 10 at one end and to remain on drone charging station 10 till fully charged before exiting at an opposite end of drone charging station 10. Thus, the drones exit drone charging station 10 in the same order that they entered. In one embodiment, shown in FIG. 3, a mounting block 30 is affixed at to top end 14 of drone charging station 10. A mounting arm 32 is affixed to mounting block 30 to allow drone charging station 10 to be affixed to a surface such as a wall.

The following discussion describes further details about base block 12, including each base block's guiding region, and how the guiding region of each base block 12 interacts with adjacent guiding regions to form drone guiding path 17 along the exterior surface of drone charging station 10.

Figure 4:
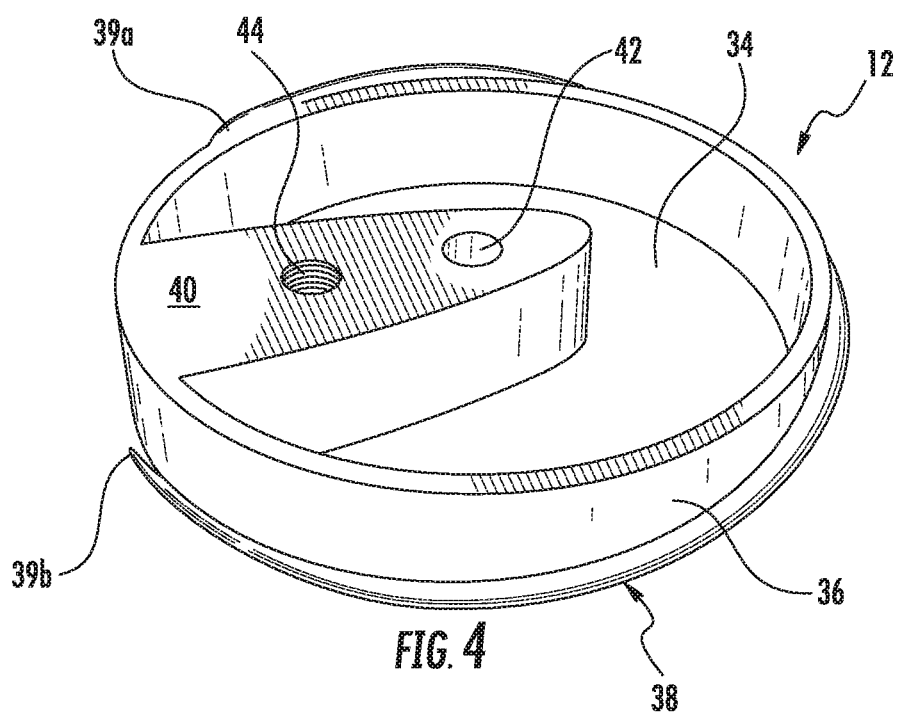
FIG. 4 is a perspective view of a base block of the drone charging station of the present disclosure.

Referring to FIG. 4, a base block 12 can be seen. Base block 12 seen in FIG. 4 could be, for example, first conductor block 12a, second conductor block 12b, or insulator block 12c. Base block 12 includes an interior region 34 and an exterior region 36. Block 12 also includes a guiding portion 38. Guiding portion 38 is, in one embodiment, in the form of a raised thread which starts along a top portion of the exterior region 36 of base block 12 in a relatively flat orientation coplanar with the top (or bottom) edge of the base block 12, e.g., at starting region 39a, to increase thickness as guiding portion 38 helically winds its way away from the top or bottom edge of the base block to form a rounded thread along the exterior region 36 gradually moving lower along exterior region 36 until thinning and terminating at ending region 39b. The thinning of the guiding portion 38 at the top and bottom edges of the base block 12 allows adjacent base blocks 12 to form a complete, substantially uniform and contiguous guiding portion 38 from base block 12 to an adjacent base block 12. Guiding portion 38 may encircle all of exterior region 36 or only a portion of exterior region 36. Guiding portion 38 is sized to receive a corresponding guiding region of drone 18, as described in greater detail below. It should be noted that the orientation of guiding portion 38 of base block 12 shown in FIG. 4 is exemplary only. Guiding portion 38 may take the form of differently arranged threads, for example, one that winds in the opposite direction than the direction shown in FIG. 4. In other embodiments, guiding portion 38 is made of a series of helically oriented pins or protrusions, rather than continuous helical threads.

Figure 8:
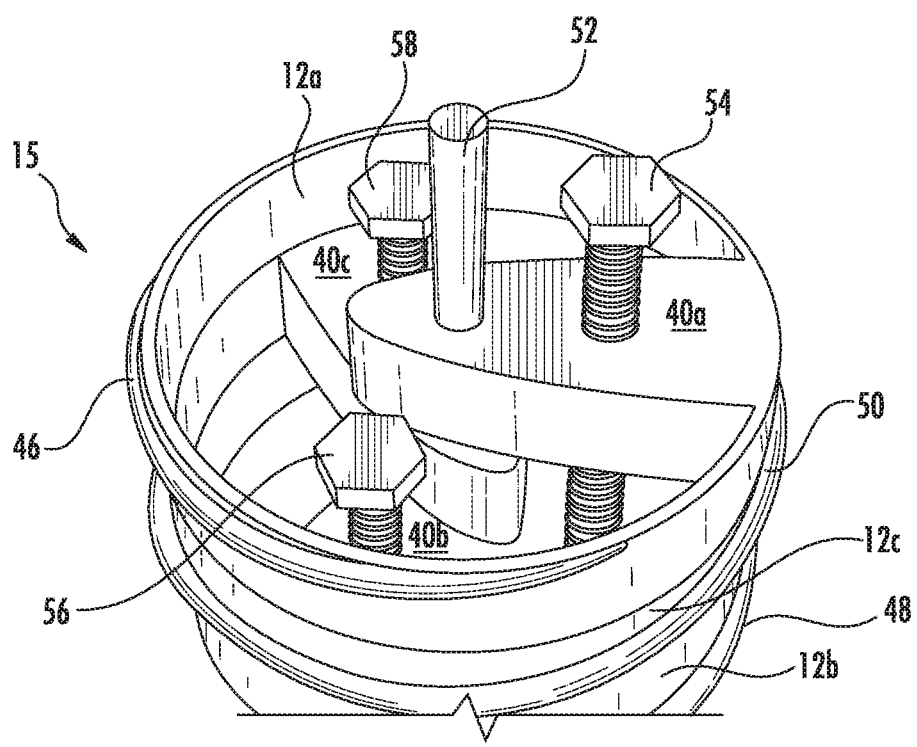
FIG. 8 is a perspective view of an arrangement of base blocks of the drone charging station showing alignment elements and coupling elements according to one embodiment of the present disclosure.

Base block 12 also includes an alignment tab 40 which extends into interior region 34 of base block 12. Alignment tab 40 includes an alignment aperture 42 sized to receive an alignment element that functions to coaxially align each of the plurality of first conductor blocks 12a, second conductor blocks 12b and insulator blocks 12c, as shown in FIG. 8 and discussed below. By aligning the base blocks 12, a cylindrically-shaped stack of base blocks 12 can be created, as shown in FIG. 1 which provides a contiguous guiding portion 38 from one end of charging station 10 to the opposite end of charging station 10. Alignment tab 40 also includes a coupler aperture 44 which is sized to receive conductor couplers and insulator couplers as shown in FIG. 8 and discussed below. In one embodiment, each of the coupler apertures 44 includes a series of interior grooves or threads such as nut threads, designed to receive corresponding threads of the conductive couplers, much like the interior threads of a nut receives corresponding outer threads of a screw. The conductive couplers and insulator couplers serve to provide structural strength to the stack of base blocks 12 and to align like base blocks 12 to each other, i.e., align first conductor blocks 12a with each other, second alignment blocks 12b with each other, and insulator blocks 12c with each other, in the base block stack arrangement of charging station 10 shown, for example, in FIG. 1. The conductor couplers also provide electrical connectivity among conductive blocks of the same polarity, and provide part of an electrical charging circuit when they are connected to a corresponding pole of an electrical charging source.

Figure 5:
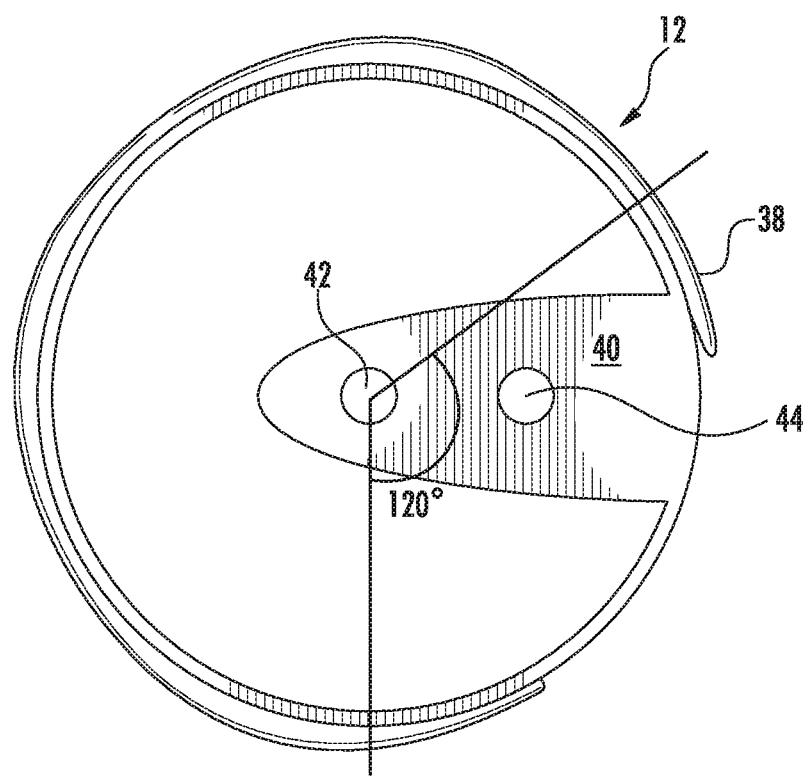
FIG. 5 is a top view of the base block of the drone charging station illustrating a thread arrangement according to one embodiment of the present disclosure.

FIG. 5 illustrates a top view of base block 12 according to an embodiment of the present disclosure. Base block 12 could be first conductor block 12a, second conductor block 12b or insulator block 12c. Base block 12 includes guiding portion 38 which is in the form of a thread that encircles part or all of the outer perimeter of base block 12. Guiding portion 38 is in the form of a raised thread of the type described above and shown in FIG. 4. In this embodiment, guiding portion 38 encircles approximately 240 degrees of base block 12. Thus, FIG. 5 shows an angle of 120 degrees where no guiding portion is present. In one embodiment, a second base block 12 is stacked below base block 12 and the guiding portion 38 of the second base block 12 will align with the guiding portion of base block 12 to form a continuous thread. In other words, the guiding portion 38, i.e. guiding threads, of the lower base block 12 will begin when the guiding portion 38 of the upper base block 12 ends. The third base block 12 can then be stacked below the second base block 12 and its threads aligned as described above. In this fashion, a stack of three base blocks 12, for example the upper base block being first conductor block 12a, the second (next lower) base block 12 being insulator block 12c, and the third (lowest) base block 12 being second conductor block 12b, will have their guiding portions 38 aligned such that a continuous guiding helical thread is formed around 360 degrees of the three-block charging stack 15.

It should be noted that in the thread arrangement described above, there can be overlap among adjacent threads. Thus, a second thread need not start exactly where an adjacent thread has ended. By overlapping the guiding portion 38, or thread, of one base block 12 with the guiding portion 38, or thread, or an adjacent base block 12, a continuous thread can be maintained without the need for exact alignment of the starting point of the thread of one base block 12 with the ending point of an adjacent base block 12. Further, it should be noted that the 120 degree/three block threading arrangement is only one embodiment of the present disclosure. For example, four base blocks 12 each having a guiding portion of 90 degrees can be aligned to form a four-block stack, where, again, a continuous guiding thread of 360 degrees is formed. Any other arrangements can be used, provided the resulting guiding thread is 360 degrees which will allow drone 18 to travel along the continuous thread of drone guiding path 17. Again, as discussed above, as drone 18 travels along guiding path 17, it is being charged when the drone's positive electrode engages first conductor block 12a (which has a positive charge) and when the drone's negative electrode engages second conductor block 12b (which has a negative charge).

Figure 6:
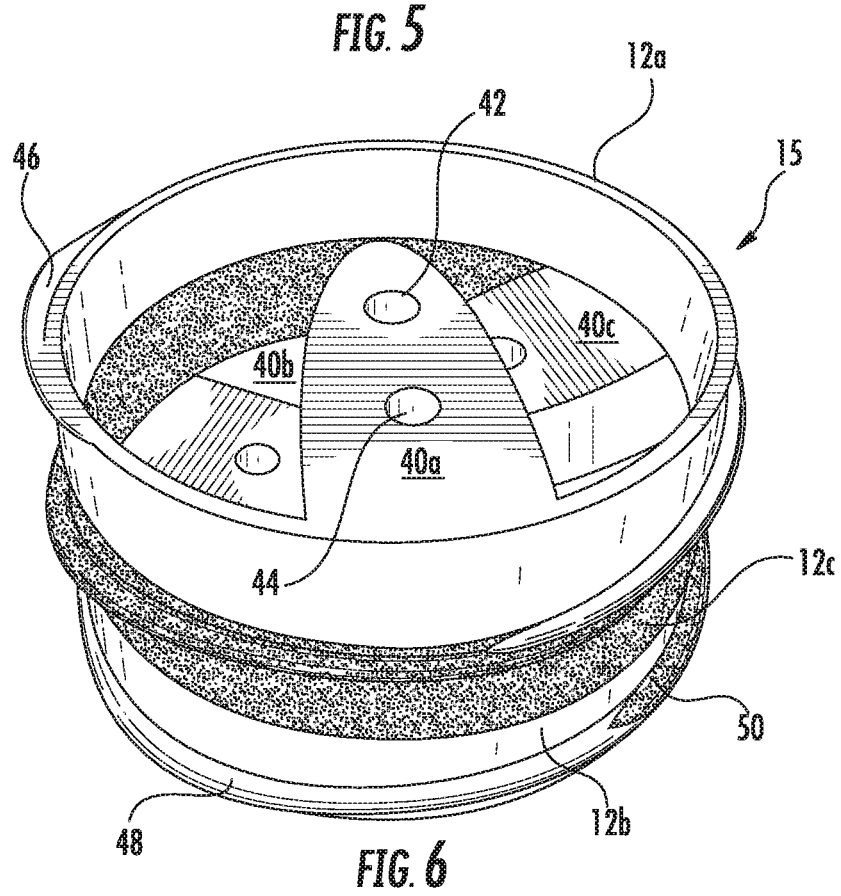
FIG. 6 is a perspective view of an arrangement of base blocks of the drone charging station including a first conductor block, a second conductor block and an insulator block in between according to one embodiment of the present disclosure.

FIG. 6 is an illustration of charging stack 15 having a plurality of base blocks 12 that form a portion of the stack of blocks shown in the drone charging station 10 of FIG. 1. Each of the plurality of base blocks 12 are sized to engage with at least one drone 18. Charging stack 15 of FIG. 6 is a three-block configuration that includes first conductor block 12a having a first polarity (i.e., positive), for electrically engaging with a corresponding first (i.e., positive) electrode of drone 18. First conductor block 12a has a corresponding first drone guiding portion 46 that encircles at least a portion of first conductor block 12a in the manner described above. The charging stack of FIG. 6 also includes second conductor block 12b having a second polarity different from the first polarity (i.e., negative), for electrically engaging with a corresponding second (i.e., negative) electrode of drone 18. Second conductor block 12c has a corresponding second drone guiding portion 48 that encircles at least a portion of second conductor block 12c in the manner described above. The charging stack of FIG. 6 also includes insulator block 12c positioned between first conductor block 12a and second conductor block 12b, where insulator block 12 has a third drone guiding portion 50 that encircles at least a portion of insulator block 12c in the manner described above.

In the embodiment shown in FIG. 6, first drone guiding portion 46 is comprised of a first thread, second drone guiding portion 48 is comprised of a second thread, and third drone guiding portion 50 is comprised of a third thread, and wherein drone guiding path 17 comprises a continuous drone guiding thread formed by an arrangement of the first thread, the second thread and the third thread. Drone guiding path 17 is formed by an arrangement of the first, second and third threads to form a continuous 360-degree thread around the three-block stack. A starting point of third drone guiding portion 50, which is the thread of insulator block 12c, is positioned proximate an ending point of the first drone guiding portion 46, which is the thread of first conductor block 12a, and a starting point of second guiding portion 48, which is the thread of second conductor block 12b is positioned proximate an ending point of third thread guiding portion 50, which is the thread of insulator block 12c.

In an alternate embodiment, the continuous threads forming the guiding portions of each base block 12 are replaced by a series of helically oriented pins or other protrusions. Thus, in one embodiment, first drone guiding portion 46 is comprised of a first plurality of pins, second drone guiding portion 48 comprises a second plurality of pins, and third drone guiding portion 50 comprises a third plurality of pins. Thus, drone guiding path 17 is formed by an arrangement of the first plurality of pins, the second plurality of pins and the third plurality of pins.

As discussed above, the angle between the start of a thread at the top of a base block 12 and the end of a thread at the bottom of an adjacent base block 12 may be, in one embodiment, 120 degrees. This is for a 3-base block formation, which gives a full 360 degrees (or multiple of 360 degree) rotation of the thread. However, the present disclosure is not limited to such an arrangement and other base block arrangements can be used, for example, a four base block arrangement, where the thread angle is 90 degrees. In other words, a 360/n degree for n base block formation may be used.

Figure 7:
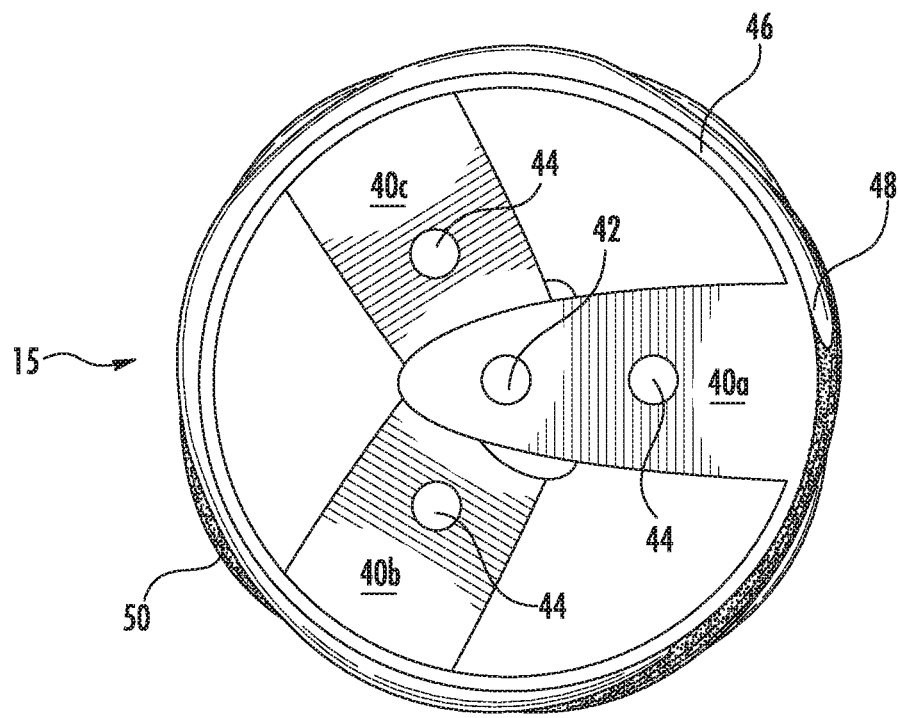
FIG. 7 is a top view of the arrangement of base blocks of FIG. 6.

FIG. 7 is a top view of charging stack 15 in which alignment tabs 40a, 40b and 40c (collectively referred to herein as alignment tabs 40) for three sequential base blocks 12 are shown. First drone guiding portion 46, second drone guiding portion 48 and third drone guiding portion 50 can be seen encircling charging stack 15. FIG. 7 shows the interaction of alignment tabs, where a first alignment tab 40a of first conductor block 12a is displaced with respect to a second alignment tab 40b of second conductor block 12b and a third alignment tab 40c of insulator block 12c, where alignment tab 40c is positioned between first alignment tab 40a and second alignment tab 40b. This arrangement allows alignment tabs 40 of the same type of base block 12 to be longitudinally aligned while allowing alignment tabs 40 of different types of base blocks 12 to be rotationally displaced from one another. As discussed below and shown in FIG. 8, alignment of the alignment tabs 40a, 40b, and 40c allow for an alignment element to be inserted within alignment aperture 42 to such that each of the base blocks 12 of drone charging station 10 do not rotate with respect to each other, i.e., become dislodged or misaligned, which may affect drone guiding path 17, and in turn, how the drones 18 move from one end to the opposite end of drone charging station 10.

FIG. 8 illustrates drone conductor stack 15 which includes first conductor block 12a, second conductor block 12b, and insulator block 12c there between. First drone guiding portion 46, second drone guiding portion 48 and third drone guiding portion 50 are shown to form part of the continuous drone guiding path 17. Alignment element 52, which could be a non-electrically conductive rod or bolt is received in the alignment aperture 42 of each of the blocks of drone conductor stack 15. For example, alignment element 52 is received in alignment aperture 42 of alignment tab 40a of first conductor block 12a, alignment aperture 42 of alignment tab 40b of second conductor block 12b, and alignment aperture 40 of alignment tab 40c of insulator block 12c. Thus, when drone charging station 10 includes a plurality of first conductor blocks 12a, second conductor blocks 12b, and insulator blocks 12c, alignment element 52 is configured to align each of the plurality of first conductor blocks 12a, second conductor blocks 12b and insulator blocks 12c with each other to form an aligned cylinder, as shown in FIG. 1. Thus, alignment element 52 maintains the stability of charging station 10 by preventing the misalignment or unwanted rotation of one of the base blocks 12, with respect to another base block 12.

Further, FIG. 8 also shows first conductor coupler 54, second conductor coupler 56 and insulator coupler 58. First conductor coupler 54 could be in the form of a bolt or screw and is electrically conductive. First conductor coupler 54 is received in a corresponding coupler aperture 44 of alignment tab 40a of first conductor block 12a. As discussed above, in one embodiment, each of the coupler apertures 44 includes a series of interior threads designed to receive corresponding threads of the conductive couplers. In another embodiment, the couplers 54, 56 and 58 may be press fit into the corresponding coupler apertures 44. Thus, first conductor coupler 54 serves to both transfer electricity by electrically coupling each of the plurality of first conductor blocks 12a together, and also serves to keep each of the first conductor blocks 12a aligned with each other. Similarly, second conductor coupler 56 is received in a corresponding coupler aperture 44 of alignment tab 40b of second conductor block 12b. Thus, second conductor coupler 56 serves to both transfer electricity by electrically coupling each of the plurality of second conductor blocks 12b together, and also serves to keep each of the second conductor blocks 12b aligned with each other. FIG. 8 also illustrates an insulator coupler 58, which couples the insulator block 12c with each of the plurality of insulator blocks 12c of drone charging station 10. Thus, conductor couplers 54 and 56, and insulator coupler 58, serve to prevent misalignment or unwanted rotation of like base blocks 12 with respect to each other.

Figure 9:
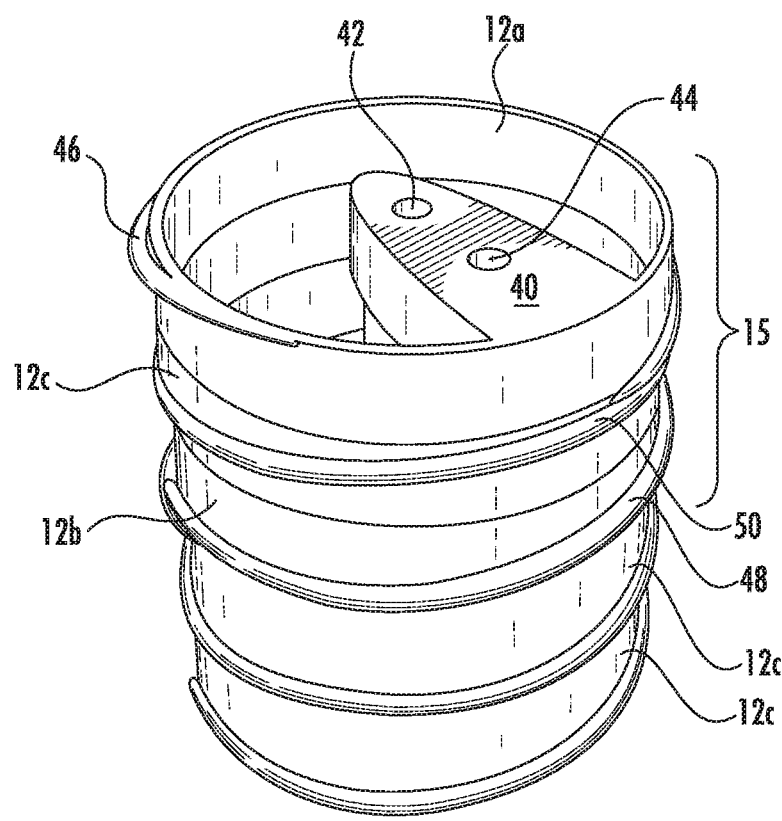
FIG. 9 is a front perspective view of an arrangement of base blocks of the drone charging station including the conductor/insulator/conductor block arrangement and an additional insulator blocks according to one embodiment of the present disclosure.

FIG. 9 is a perspective view of an arrangement of base blocks 12 of the drone charging station 10. The arrangement includes charging stack 15, i.e., an arrangement of first conductor block 12a/insulator block 12c/second conductor block 12b, and also includes additional insulator blocks 12c.

A portion of drone guiding path 17 is shown winding around the exterior of the stack of base blocks 12a, 12c, and 12b. Drone guiding path 17 includes first guiding path 46, third guiding path 50, and second guiding path 48, which forms a continuous thread to allow one or more drones 18 to work their way from one end of drone charging station 10 to an opposite end, while being charged. As discussed above, the insertion of additional insulator blocks 12c between charging stacks 15 creates spacing to allow multiple drones 18 to be charged by drone charging station 10 at the same time without the drones 18 colliding with one another. Any number of insulator blocks 12c can be used as "spacers." The additional "spacer" insulator blocks 12c each include a respective guiding thread so there is no break in or interruption of drone guiding path 17.

In another embodiment, additional conductors can be added to the 3-base block formation. The additional conductor could be used, for example, for data transfer, for charging at a second voltage or for sensing the level of charge of the drone battery. Thus, additional conductor blocks can be used for the transmission of different voltages to drone 18 for the creation of a wired data channel for higher data transmission. Thus, first conductor 12a can be the first base block 12 in the drone conductor stack 15, followed by an insulator block 12c, followed by second conductor block 12a, followed by another insulator block 12c, followed by a third conductor block 12, which could be used for data transmission to/from drone 18. The orientation can also be reversed, where the first base block 12 represents the third conductor block that is used for data transmission, and the first and second conductor blocks are used for charging a corresponding electrode on drone 18. Additional insulator blocks 12c can then be used for spacing purposes as described above.

Thus, in one embodiment, drone charging station 10 further includes a third conductor block for electrically engaging with a corresponding electrode of drones 18, and a second insulator block positioned between one of the first conductor block 12a and the third conductor block and the second conductor block 12b and the third conductor block. In one embodiment, the third conductor block is configured to provide data transmission to drones 18.

In yet another embodiment, where multiple insulator blocks 12c are used for spacing purposes, as shown in FIG. 9, instead of a stack of multiple individual insulator blocks 12c, a single thicker insulator unit could be used. The single insulator unit could be manufactured to be of the same or similar thickness as a stack of separate, individual insulator blocks 12c, thus providing the same delay or spacing feature as in the individually-stacked insulator block 12c embodiment.

Figure 10:
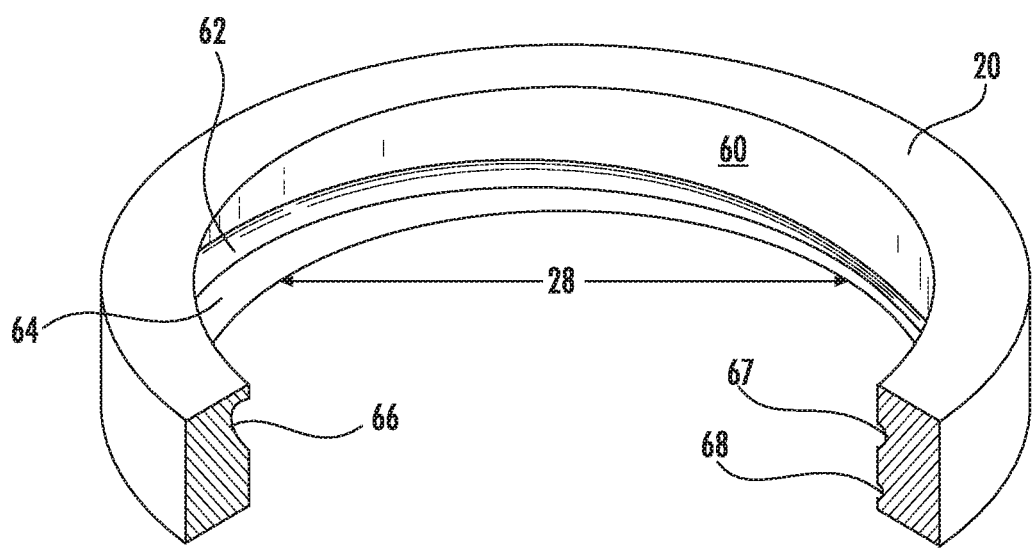
FIG. 10 is a perspective view of a portion of the inner aperture of the drone showing inner grooves for mating with the thread arrangement of the drone charging station according to one embodiment of the present disclosure.

FIG. 10 is a partial view of the receiving region 28 of the center portion 20 of drone 18. As described above, drone 18 includes a first electrode 60, and a second electrode 64 having a polarity different from first electrode 60. Thus, for example, first electrode 60 could be a positive polarity electrode while second electrode 64 may be negative, or vice versa. Drone 18 also includes an insulator region 62 between first electrode 60 and second electrode 64. In operation, when drone 18 is engaged with charging station 10, as the drone rotates along charging station 10, first electrode 60 is electrically engaged with a corresponding first conductor block 12a of the same polarity and a second electrode 64 is electrically engaged with second conductor block 12b of the same polarity, thus allowing drone 18 to sequentially receive an electrical charge as it travels along drone charging station 10. In the embodiment of FIG. 10, a portion of the first electrode 60, the second electrode 64 and the insulator region 62 are disposed around at least a portion of receiving region 28. In one embodiment, receiving region 28 is thick enough to engage with three adjacent charging blocks 12 to allow electrodes 60 and 64 to contact corresponding conductor blocks 12a and 12b within a charging stack 15.

In one embodiment, to enable the coupling of the electrodes of drone 18 with the conductors of drone charging station 10, first electrode 60 includes a first guiding region 66, second electrode 64 includes a second guiding region 68, and insulator region 62 includes a third guiding region 67. Thus, in one embodiment, the arrangement of guiding regions as shown in FIG. 10, form a guiding system that includes at least a portion of first guiding region 66, second guiding region 68, and third guiding region 67, where the guiding system is configured to engage drone guiding path 17 of drone charging station 10.

In one embodiment, as shown in FIG. 10, first guiding region 66, second guiding region 68, and the third guiding region 67 are recessed threads, where each of the recessed threads are configured to engage a corresponding thread of drone charging station 10, much like threads on a nut engage threads on a screw. The recessed threads are disposed around receiving region 28, such that when drone 18 engages drone charging station 10, the electrodes 60 and 64 of drone 18 are electrically coupled with first conductor block 12a and second conductor block 12b respectively. Further, drone 18 is able to rotate from one end of drone charging station 10 and exit the opposite end due to the engagement of the recessed threads along the interior of receiving region 28 with drone guiding path 17 along the exterior of drone charging station 10.

Figure 11:
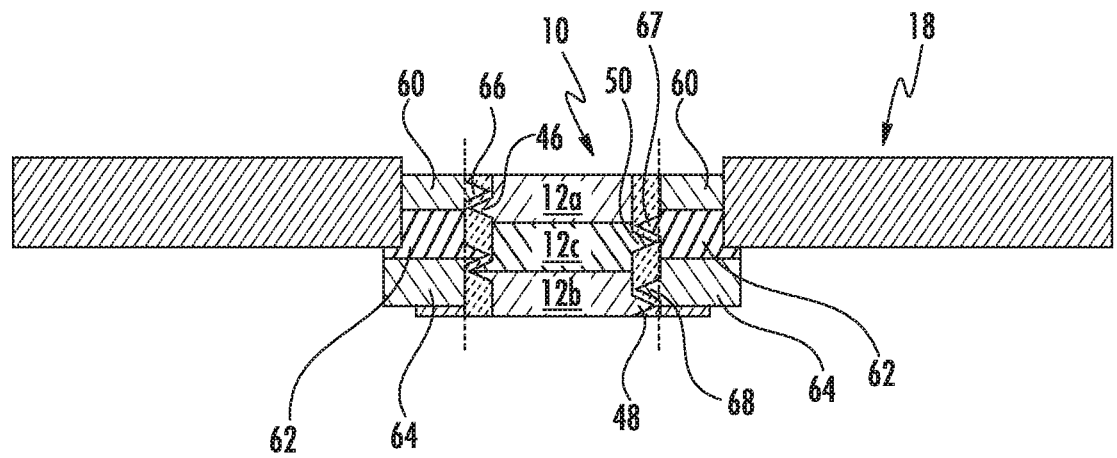
FIG. 11 is a front cut-away view showing the engagement of the drone guiding region with the drone charging station guiding threads according to one embodiment of the present disclosure.

FIG. 11 illustrates a front, cut-away view showing the engagement of drone 18 with drone charging station 10. As shown, first guiding region 66 of first electrode 60 of drone 18 engages with first drone guiding portion 46 of first conductor block 12a of drone charging station 10. Second guiding region 68 of second electrode 64 engages with second drone guiding portion 48 of second conductor block 12b of drone charging station 10. Third guiding region 67 of insulator 62 of drone 18 engages with third drone guiding portion 50 of insulator block 12c of drone charging station 10.

Figure 12:
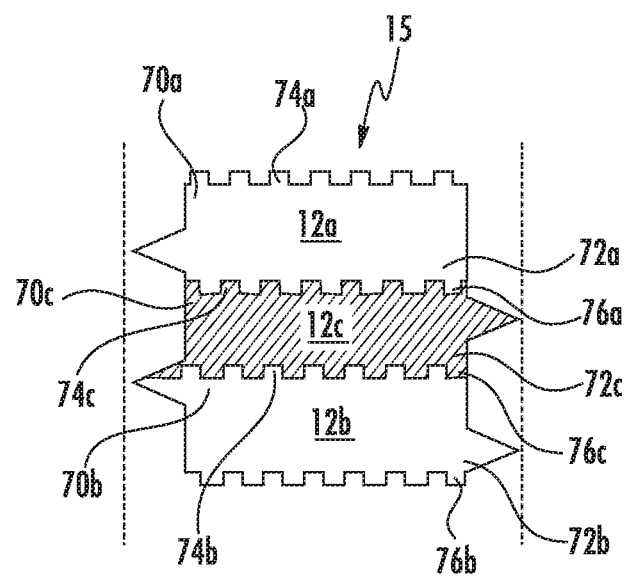
FIG. 12 is a front cut-away view showing the interlocking between base blocks in order to cylindrically align the base blocks and prevent rotational misalignment according to one embodiment of the present disclosure.

FIG. 12 illustrates another embodiment of the present disclosure where each of conductor block 12a, conductor block 12b and insulator block 12c of charging stack 15 includes an engagement element to prevent the dislodging or misalignment of the three blocks that form charging stack 15. First conductor block 12a includes a first end 70a, and a second end 72a opposite the first end 70a. Second conductor block 12b includes a first end 70b and a second end 72b opposite first end 70b. Insulator block 12b includes a first end 70c and a second end 72c opposite first end 70c. First conductor block 12a also includes a first engagement element 74a extending from its first end 70a and a second engagement element 76a extending from its second end 72a. Similarly, second conductor element 12b includes a first engagement element 74a extending from its first end 70b and a second engagement element 76b extending from its second end 72b. Insulator element 12c also includes a first engagement element 74c extending from its first end 70c and a second engagement element 76c extending from its second end 72c.

Each engagement element could be in the form of protrusions that interlock with the engagement element of an adjacent block 12 in the form of a finger joint. Thus, as shown in FIG. 12, second engagement element 76a of first conductor block 12a interlocks with first engagement element 74c of insulator block 12c. Similarly, second engagement element 76c of insulator block 12c engages with first engagement element 74b of second conductor block 12b. If additional insulator blocks 12c are stacked on either side of charging stack 15 as in the arrangement depicted in FIG. 1, each of the additional insulator blocks 12c can interlock with adjacent blocks in a similar manner. Thus, each of the plurality of blocks of drone charging station 10 includes a first end having a first engagement element and a second end having a second engagement element, the first end opposite the second end, wherein the first engagement element is matable with the second engagement element of an adjacent block to prevent rotational misalignment. It is understood that engagement elements are not limited to finger joint-like protrusions and the other types of interlocking arrangements, e.g., "tongue in groove," tabs, etc., may be used.

Figure 13:
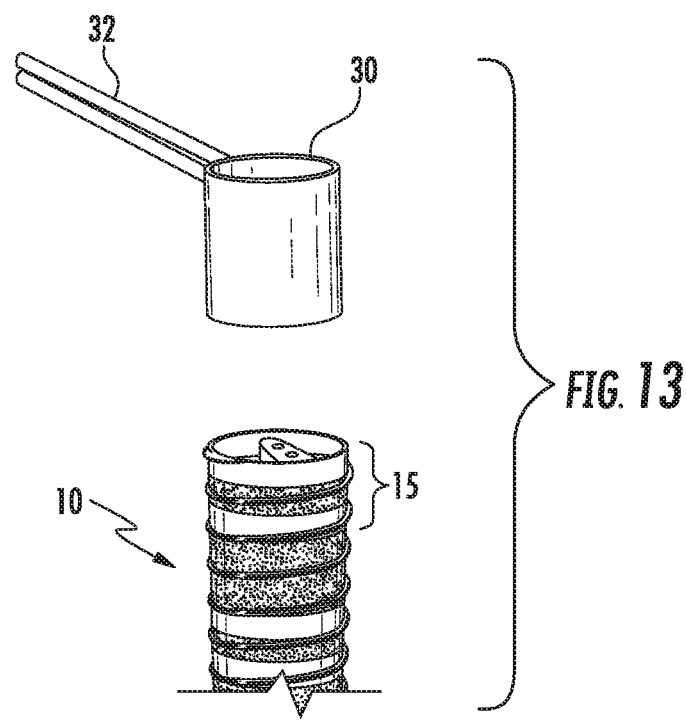
FIG. 13 is a perspective view of a portion of the drone charging station with a mounting element to enable the drone charging station to be mounted to a surface according to one embodiment of the present disclosure.

FIG. 13 illustrates another embodiment of the present disclosure. Drone charging station 10 may be mounted on a surface such as a wall, overhang, or ceiling. FIG. 13 depicts a wall-mounted version of drone charging station 10. Mounting block 30 is added to the stack of blocks of drone charging station 10. Mounting block 30 may be added to the top end of the stack of blocks or to the bottom, or two mounting blocks 30 may be added to drone charging station 10, i.e., one mounting block added to the top end of the stack of blocks and another mounting block 30 added to the bottom end of the stack of blocks. Each mounting block 30 will be mounted to a surface by a corresponding mounting arm 32. Mounting arm 32 is connected at one end to the mounting surface and at its other end to mounting block 30. Mounting arm 32 can be made of a conductive material such as metal to provide electricity to first conductor coupler 54 and second conductor coupler 56 (not shown). If the mounting surface is a ceiling or overhang, i.e., above drone charging station 10, a vertically-oriented mounting arm 32 is affixed to mounting block 30. As described above and shown in FIG. 2, each drone includes mounting aperture 26 which is configured to allow drone 18 to travel past mounting arm 32 that affixes drone charging station 10 to a surface.

Figure 14:
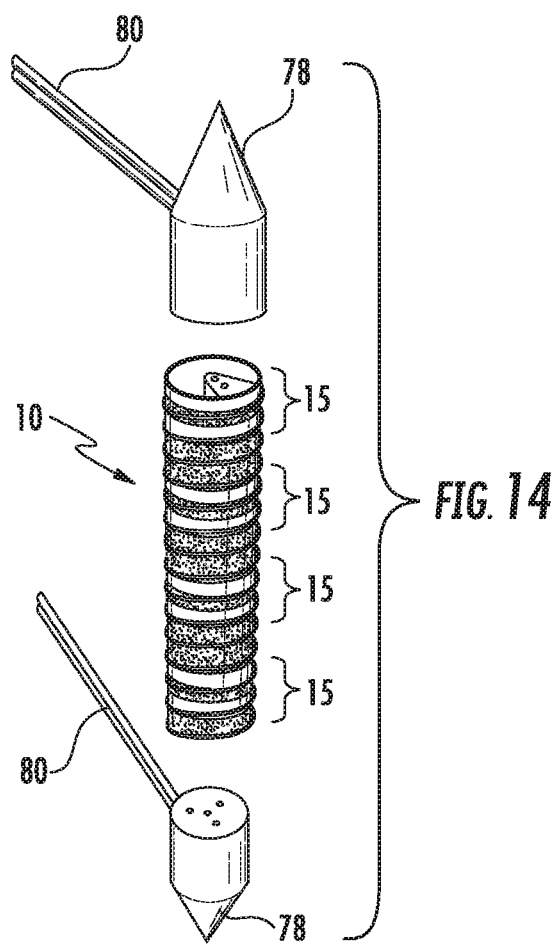
FIG. 14 is a perspective view of the drone charging station with a cone-shaped element to facilitate entrance and exit of the drones with respect to the drone charging station according to one embodiment of the present disclosure.

FIG. 14 depicts yet another embodiment of the present disclosure. An accessory block 78 having a first end is affixed to an end of drone charging station 10, i.e., multiple charging stacks 15, separated by one or more insulator blocks 12c. In one embodiment, the accessory block 78 is cone-shaped and is tapered toward the end opposite the end affixed to the end of charging stack 15. The use of a tapered, or "cone-shaped" accessory block facilitates the approach and/or exit of the drones 18 by allowing the receiving region 28 of drone 18 to receive the tapered end of accessory block 78. Cone attachment mounting arm 80 is attached at one end to accessory block 78 and at its other end to a surface such as a wall or a ceiling. In one embodiment, two cone-shaped accessory blocks 78 are added to the stack of blocks of drone charging station 10, i.e., one cone-shaped accessory block 78 is affixed or otherwise mounted upon one end of drone charging station 10 and a second cone-shaped accessory block 78 is affixed or otherwise mounted to the opposite end of the drone charging station 10. In this fashion, both the entrance of the drones 18 upon drone charging station 10 and the exit of the drones 18 from drone charging station is facilitated. Similar to mounting arm 32, cone attachment mounting arm 80 affixed accessory block 78 to a surface. Cone attachment mounting arm 80 may be made of a conductive material such as metal in order to provide electricity to the conductor couplers 54 and 56 (not shown) of drone charging station 10.

Figure 15:
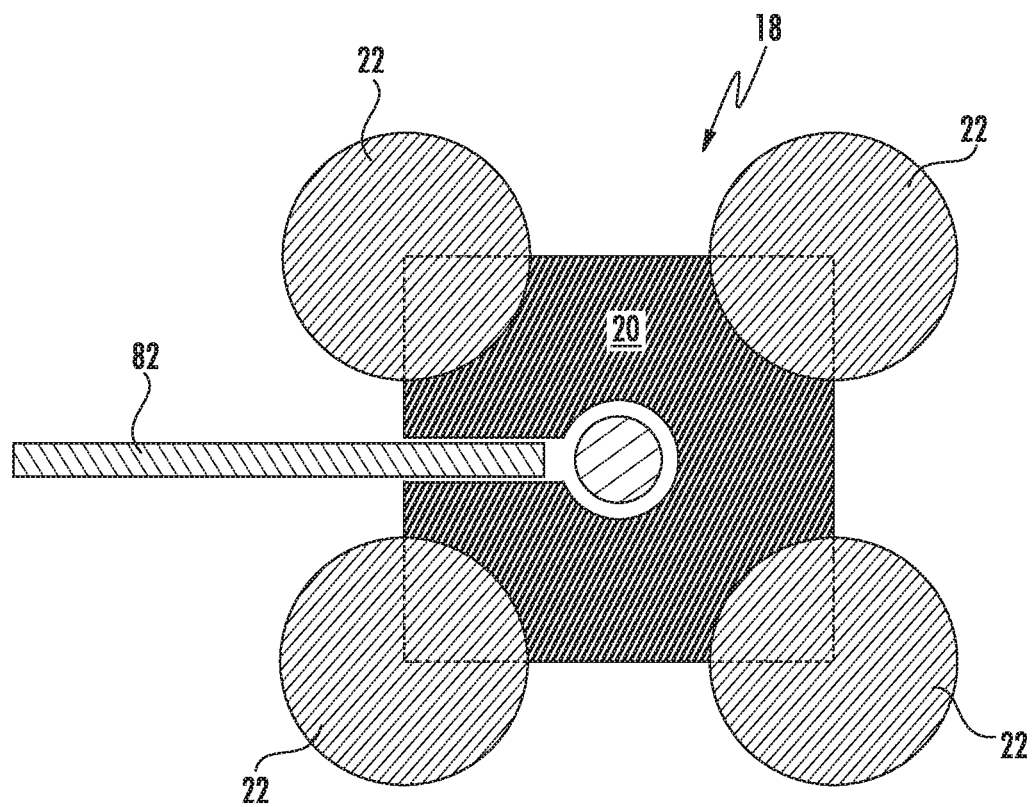
FIG. 15 is a top view of a drone and a lock plate that prevents the drone from rotating with respect to the drone charging station according to one embodiment of the present disclosure.
Figure 16:
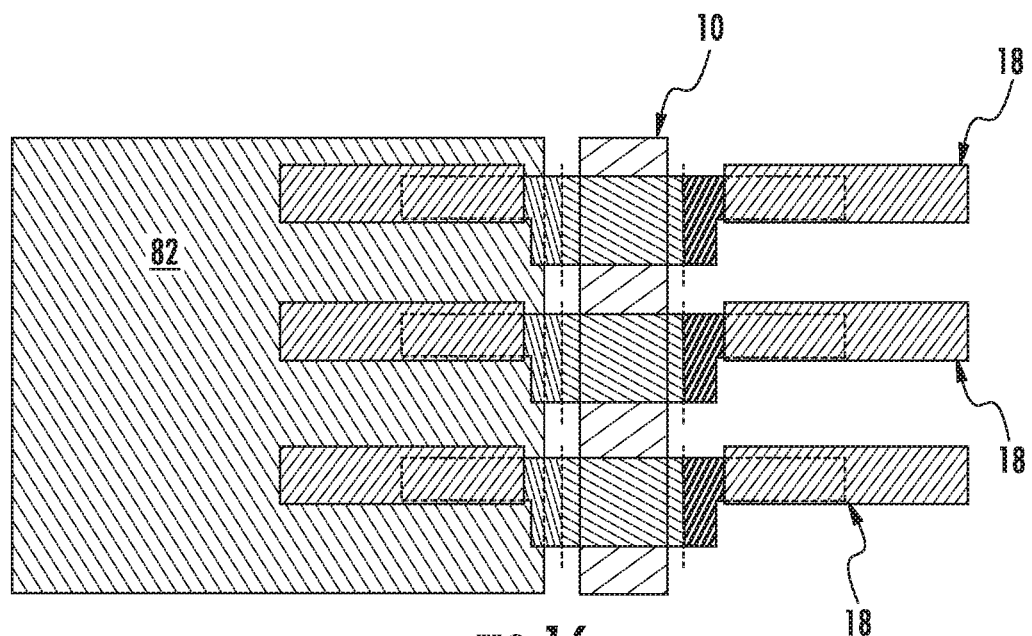
FIG. 16 is a front cut-away view of multiple drones in the drone charging station where each drone includes a lock plate according to one embodiment of the present disclosure.

FIGS. 15 and 16 illustrate another embodiment of the present disclosure. In this embodiment, drone charging station 10 includes at least one motor (not shown) that can be installed inside drone charging station 10, or for example, either at the bottom or the top of the stack of base blocks 12. The motor is configured to enable drone charging station 10 to rotate about a shaft, e.g., alignment element 52, where the drone charging station 10 rotates with respect to the drones 18. In one embodiment, the base blocks 12 of drone charging station 10 rotate with respect to the mounting blocks 30 situated at one or both ends of drone charging station 10, which serve to hold drone charging station 10 in place. Thus, as the drone charging station 10 rotates, the base blocks 12 also rotate but the mounting blocks 30 remain fixed. Thus, instead of the drones 18 rotating around a stationary cylinder of base blocks 12, the cylinder of blocks rotates with respect to stationary drones 18.

In this embodiment, in order to prevent drones 18 from rotating once drones 18 enter drone charging station 10, a rotation inhibitor 82, which could be in the form of a locking plate, is inserted within mounting aperture 26 to lock drones 18 at a predetermined angle or orientation. Rotation inhibitor 82 is configured to inhibit the rotation of drones 18 when they contact drone charging station 10, thereby allowing drones 18 to travel along drone guiding path 17 due to the rotation of drone charging station 10, rather than due to the rotation of the drones 18. When drone charging station 10 rotates, drones 18 move up or down drone guiding path 17 relative to drone charging station 10 because of the mechanical interaction between the drone threads and those on the drone charging station 10. Advantageously, this embodiment allows drones 18 to conserve energy when moving along drone charging station 10. Further, this embodiment may be beneficial for low-power drones 18 that may have trouble in providing enough torque to rotate along the drone charging station 10, and instead providing one or more motors of sufficient power and/or torque.

As shown in FIG. 16, multiple drones 18 are engaged with drone charging station 10. In this embodiment, each drone 18 has a rotation inhibitor 82 inserted within the drone's mounting aperture 26, to prevent each drone from rotating. Instead, one or more motors are used to allow drone charging station 10 to rotate while each drone 18 is prevented from rotating. The effect is the same as if the drones 18 were rotating with respect to a stationary drone charging station 10, with the result being that drones 18 enter one end of drone charging station 10 and travel along drone guiding path 17 in the manner described above while being charged, until exiting drone charging station 10 at the opposite end from which they entered. The result is a drone charging station 10 that provides a first-in-first-out (FIFO) feature, which enables drones 18 that enter drone charging station 10 at one end to remain on drone charging station 10 till fully charged before exiting at an opposite end of drone charging station 10. Thus, the drones exit drone charging station 10 in the same order that they entered.

In another embodiment, drone charging station 10 provides a last-in-first-out (LIFO) feature, which enables the last drone 18 that enter drone charging station 10 at one end to remain on drone charging station 10 till adequately charged before exiting at the same end of drone charging station 10. Thus, that specific drone 18 could exit drone charging station 10 out of order, if required.

In one embodiment, rotation inhibitor 82 is in the form of a movable lock plate, where the size and dimensions of the lock plate can vary based on the size of the drones 18. This can be used to accommodate smaller drones, where the lock plate can then return to a larger size for larger drones 18. In another embodiment, rotation inhibitor 82 could be in the form of bar instead of a lock plate, and configured to perform the same function as the lock plate.

In one embodiment, rotation inhibitor 82 is in the form of an expandable lock plate that can be transformed into various shapes, for example, into a T-shape at the end of the lock plate closest to the shaft of drone charging station 10 in order to "lock" those drones 18 to drone charging station 10 that do not have mounting aperture 26.

In one embodiment, rotation inhibitor 82 is in the form of a magnetic-enhanced lock plate. In this embodiment, the lock plate and mounting aperture 26 are fabricated from magnetic materials of opposite polarity to enhance the locking action. For example, referring to FIG. 16, if the magnetic material of rotation inhibitor 82 on a first side (for example, the left side when looking at the front cut-away view of FIG. 16) of drone charging station 10 is of a first polarity, then the corresponding first side (i.e., the left inner side of drone charging station 10 in FIG. 16) of the drone's mounting aperture 26 is of an opposite polarity. Similarly, if the magnetic material of rotation inhibitor 82 on a second side (for example, the right side when looking at the front cut-away view of FIG. 16) of drone charging station 10 is of a first polarity, then the corresponding second side (i.e., the right inner side of drone charging station 10 in FIG. 16) of the drone's mounting aperture 26 is of an opposite polarity.

In another embodiment, the rotation inhibitor 82 includes guiding indicia to assist in alignment of the rotation inhibitor 82 within mounting aperture 26. The guiding indicia could be any visual indicia, for example, a line, or a groove or recess parallel to the axis of the drone charging station 10 on one or both sides of the rotation inhibitor 82. In another embodiment, a corresponding wedge on the inner side of the drone's mounting aperture 26 could be implemented in order to fit into the recess of the rotation inhibitor 82.

In one embodiment, one or more step motors are utilized to rotate drone charging station 10. Although the present disclosure is not limited to the number or types of motors used to rotate drone charging station 10, stepper motors could be considered in order to have a predefined movement of the motor without requiring sensory equipment or utilizing reduced sensory equipment. The sensory equipment helps in the control of the rotation of drone charging station 10 and the movement of drones 18 in order to ensure proper alignment of the electrical contact points on drone charging station 10 and drones 18. With the use of stepper motors, or other similar precision devices, the sensory equipment could be reduced or removed entirely.

Figure 17:
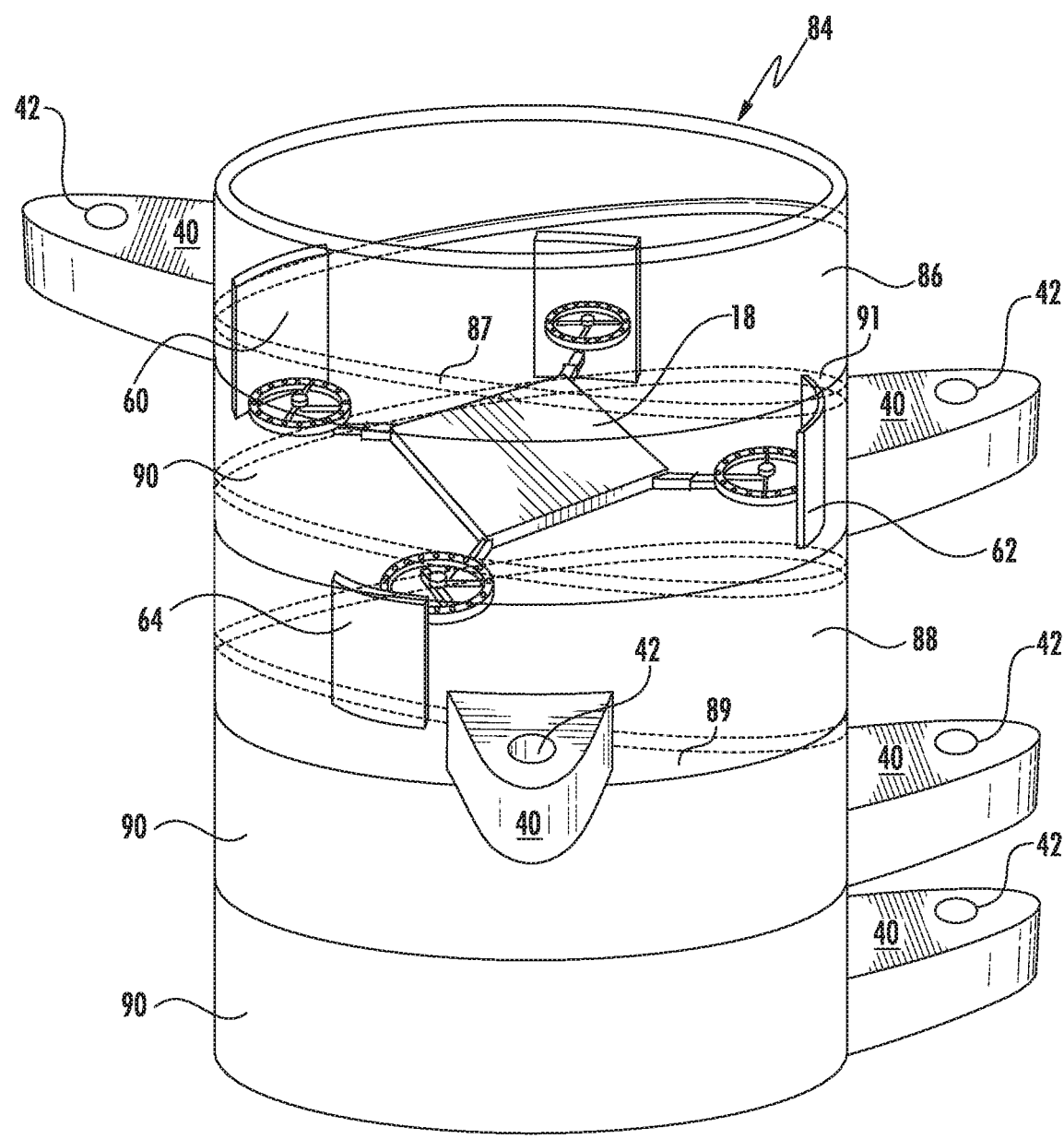
FIG. 17 is a perspective cut-away showing a drone being charged inside a hollow charging tube according to one embodiment of the present disclosure.

FIG. 17 illustrates another embodiment of the present disclosure, where instead of drones 18 engaging with drone charging station 10 via a drone guiding path 17 on the exterior of drone charging station 10, drones 18 enter a hollow charging tube 84 and engage with corresponding guiding paths along the interior of hollow charging tube 84. For simplicity, only a portion of hollow charging tube 84 is shown in FIG. 17, and only one drone 18 is shown as entering hollow charging tube 84. It is within the scope of the present disclosure for hollow charging tube 84 to be much longer, i.e., of sufficient length and circumference to receive multiple drones 18 at the same time.

In this embodiment, each drone 18 includes a stack of at least three elements at its edges in order to be able to enter hollow charging tube 84. These elements may include guiding regions to provide a guiding path or anchor for each drone 18 and also include electrical elements to provide the electrical connectivity to corresponding conductors in hollow charging tube 84.

Hollow charging tube 84 includes a plurality of interior conductor blocks along the interior of hollow charging tube 84, each of the plurality of interior conductor blocks sized to engage with and charge one or more drones 18 as the drones 18 travel within hollow charging tube 84. Hollow charging tube 84 includes a first interior conductor block 86 having a first polarity for electrically engaging with a corresponding first electrode 60 of drone 18, the first interior conductor block 86 having a first drone guiding portion 87. Hollow charging tube 84 includes second interior conductor block 88 having a second polarity different from the first polarity for electrically engaging with a corresponding second electrode 64 of drone 18, the second interior conductor block 88 having a second drone guiding portion 89. Hollow charging tube 84 includes an interior insulator block 90 positioned between first conductor block 86 and second conductor block 88, the interior insulator block 90 having a third drone guiding portion 91 that engages with insulator 62. First drone guiding portion 87, second drone guiding portion 89 and third drone guiding portion 91 are arranged to provide a drone guiding path along an interior of hollow charging tube 84.

In one embodiment, first conductor 86 is located at a different relative height along drone 18 within hollow charging tube 84 as compared with second conductor 88. Thus, as each of the drones 18 travel down (or up) within hollow charging tube 84, the first electrode 60 of each drone 18 receives a charge from a corresponding first interior conductor block 86 situated at a first height within the interior of hollow charging tube 84 and the second electrode 64 of each drone 18 receives a charge from a corresponding second interior conductor block 88 situated at a second height within the interior of hollow charging tube 84. This continues as each drone 18 rotates within the interior of hollow charging tube 84, until each drone 18 has received sufficient charge, and exits an opposite end of hollow charging tube 84.

Thus, in this embodiment, one or more drones 18 are engaged within hollow charging tube 84 by entering inside a first end of hollow charging tube 84 and exiting an opposite end of hollow charging tube 84 after being charged. Guiding portions, i.e., first guiding portion 87, second guiding portion 89 and third drone guiding portion 91, which could be in the form of threads or protrusions such as pins, are situated on the inside of hollow charging tube 84. Corresponding guiding regions can also be placed on the peripheral portion of each drone 18, for example, on an outer edge of their blade protection area, and along electrodes 60 and 64 and insulator 62. The drones 18 perform a rotating action within hollow charging tube 84 in order to move from one instance of charging to the next instance of charging and finally out of the opposite end of hollow charging tube 84. In one embodiment, hollow charging tube 84 includes one or more apertures to allow for air to flow within hollow charging tube 84.

In another embodiment, a design similar to the embodiment depicted in FIGS. 1-16 and described above may be used, in order to provide a modular charging station. In one embodiment, a two-connection design is used where each individual charger along hollow charging tube 84 is composed of multiple similar blocks, for example, six, in which the first and the third one are made of a conductive material and the remaining blocks (second, fourth to sixth) are made of non-conductive, i.e., insulator material. All conducting blocks of each type of connection (for example all those connected to the higher voltage point of hollow charging tube 84) are connected by inserting alignment element 52 within alignment aperture 42 of alignment tab 40 outside hollow charging tube 84, as depicted in FIG. 17. Additional alignment elements 52 bars can be used to make hollow charging tube 84 more rigid.

In another embodiment, drone charging station 10 includes a plurality of hollow charging tubes 84 resulting in a plurality of first interior conductor blocks 86, a plurality of second interior conductor blocks 88 and a plurality of interior insulator blocks 90. Similar to the embodiment depicted in FIGS. 1-16, drone charging station 10 an alignment element 52, as discussed above, configured to align each of the plurality of first interior conductor blocks 86, second interior conductor blocks 88 and interior insulator blocks 90 to form a cylinder. The drone charging station 10 of this embodiment, similar to the embodiment depicted in FIGS. 1-16, includes a first conductor coupler, the first conductor coupler electrically coupling each of the plurality of first interior conductor blocks 88 together, the first conductor coupler being electrically conductive, and a second conductor coupler, the second conductor coupler electrically coupling each of the plurality of second interior conductor blocks 90 together, the second conductor coupler being electrically conductive. Drone charging station 10 may also include an insulator coupler, the insulator coupler coupling each of the plurality of insulator blocks together.

In another embodiment, first interior conductor block 86, second interior conductor block 88 and interior insulator block 90 each include a first end having a first engagement element and a second end having a second engagement element, the first end opposite the second end, wherein the first engagement element is matable with the second engagement element of an adjacent block to prevent rotational misalignment.

In another embodiment, drone charging station 10 further includes at least one insulator layer, the at least one insulator layer comprising at least one interior insulator block 90, the at least one insulator layer positioned between a first hollow charging tube 84 and a second hollow charging tube 84.

In another embodiment, drone charging station includes at least one motor configured to enable the at least one hollow charging tube 84 to rotate; and a rotation inhibitor to inhibit rotation of at least one drone 18 when at least one drone 18 enters drone charging station 10, the at least one drone 18 traveling along the drone guiding path due to the rotation of the at least one hollow charging tube 84.

In another embodiment, a cap or cover can be placed or affixed to the either end or both ends of hollow charging tube 84 in order to protect hollow charging tube 84 and drones 18 from external elements such as rain or other weather or non-weather-related external impact.

In another embodiment, the inside of hollow charging tube 84 is capable of being accessed via an opening in one or both sides of hollow charging tube 84 for the purpose of maintenance to hollow charging tube 84 and/or the drones 18 inside.

In another embodiment, hollow charging tube 84 includes a short-range optical or RF sensor, or radar equipment on one or both ends of hollow charging tube 84 in order to help in the navigation of drones 18 in their approach of hollow charging tube 84.

In another embodiment, an inverted half-cone can be placed or affixed to one or both ends of hollow charging tube 84 in order to assist in guiding the drones 18 into hollow charging tube 84.

Figure 18:
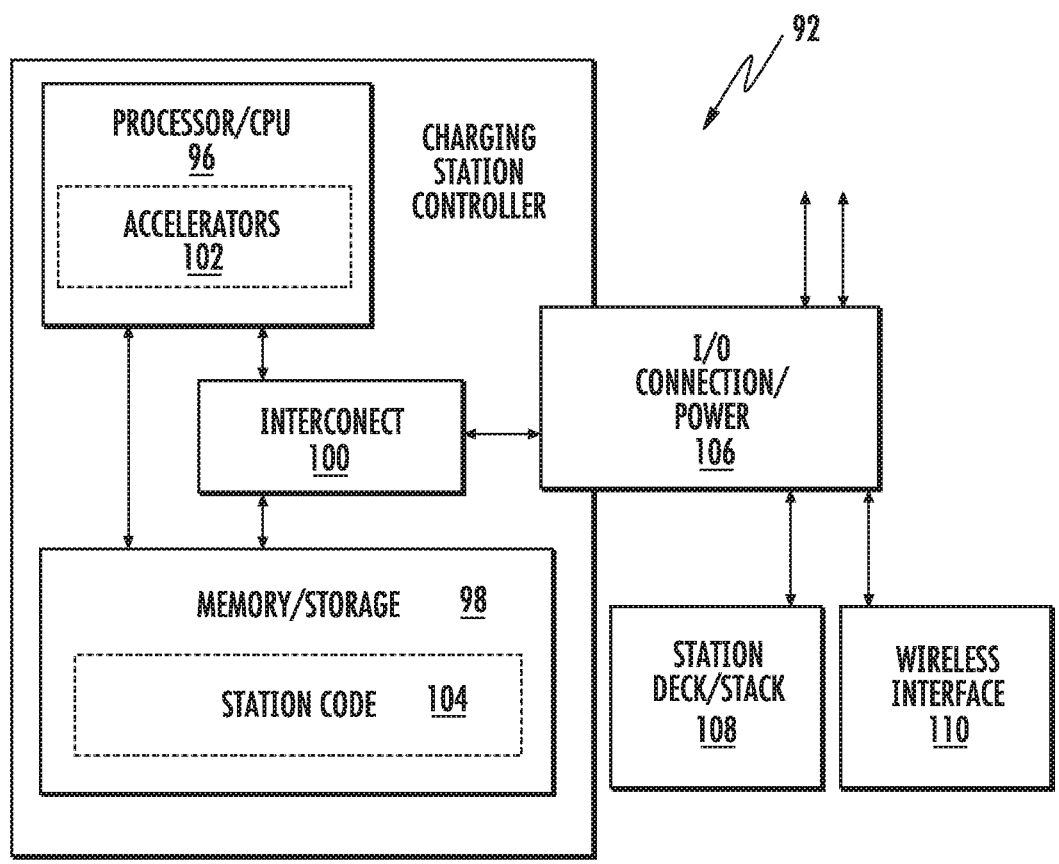
FIG. 18 is a block diagram of a controller configured to control the drones as they engage with the drone charging station according to one embodiment of the present disclosure.

FIG. 18 is a block diagram of a charging station controller 92 that may be used to allow drones 18 to use drone charging station 10. Charging station controller 92 may be located either on the drone 18 or it can be located and operated remotely, i.e., on the operator cloud dew, edge, or core.

In FIG. 18, the solid lines indicate signal connections and the hashed lines indicate power connections. Charging station controller 92 includes a processor 96, a memory or storage 98, and interconnection 100 which provides a communication interface between processor 95 and memory 98. Memory 98 may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Processor 96 includes accelerators 102. Accelerators 102 can supply functions including but not limited to floating point unit (FPU) functions, graphics processing unit (GPU) functions, tensor processing unit (TPU) functions, or field-programmable gate array (FPGA) functions. Accelerators 102 may share the same silicon die with a main processor in system on chip (SoC) configurations.

Charging station software code 104, which is stored in memory 98 is configured to handle power transmission to the stack of base blocks 12 of drone charging station 10 and also configured to perform various drone-related tasks, such as, for example, approach, landing, and exiting, among others tasks. An Input/Output ("I/O") power component 106 enables charging station controller 92 to perform power processing before delivering power to drones 18 that have entered drone charging station 10. Processor 96 processes charging station software code 104 during operation of the power distribution and drone-related tasks.

The present disclosure describes a drone charging station 10 that can be used for simultaneous charging of multiple drones 18. In order for drones 18 to be able to use drone charging station 10, there may be protocols that need to be followed by drones 18 in order to avoid collision between drones 18 and for drone charging optimization. The protocols may vary depending on the type of drone 18 utilizing drone charging station 10.

Fully Independent Drones

In this embodiment, each drone 18 is arranged be able to navigate inside on its own. This can be done by utilization of sensors and cameras for positioning and navigation. Drone 18 must also be able to locate and align itself with drone charging station 10 and proceed with enter/charge/stay/exit maneuvers. In this scenario, charging station controller 92 does not need to intervene with drone maneuvers. However, charging station controller 92 can observe and/or log the operations of the drones 18 and maintain the performance of drone charging station 10. Each drone 18 must also be able to locate other drones 18 which are approaching drone charging station 10 and avoid colliding with them with a simple protocol. When drone 18 enters drone charging station 10, it must move up (or down) to the highest (or lowest) available position. Drones 18 must move up (or down) according to the drone above (or below) them. If the drone's charge is complete and there are drones 18 below (or above) them, drone 18 must leave drone charging station 10 to make room for other drones 18 to be charged.

Collision Avoidance Protocol

If two or more drones 18 are approaching drone charging station 10, drones 18 only approach drone charging station 10 if there is no drone on its left (relative to the direction of the drone charging station 10). If there is a drone 18 on its left, drone 18 will maintain its position until the drone on its left completes its maneuver entering drone charging station 10.

Cloud (Edge) Controller

In this embodiment, drones 18 do not have the internal capability to navigate and instead receive the navigation commands directly from a central charging station controller 92. The central charging station controller 92 uses positioning technology for locating drones 18 and drone charging station 10. Examples of positioning technology could be cameras, indoor positions systems, and short-range radar (i.e., time-of-flight camera, etc.), radio frequency ID (RFID), etc. The central charging station controller 92 then receives the battery-charge-information of drones 18, determines which drone 18 must enter drone charging station 10 first and sends the correct navigation commands to that particular drone 18. If it is determined that more than one drone 18 must charge at the same time, the central charging station controller 92 will calculate a delay period and will send each drone 18 to drone charging station 10 with a calculated delay in between.

Hybrid Controller

In this scenario, the drones 18 should obtain additional information from charging station controller 92 to land safely. In the hybrid controller scenario, drones 18 have some navigation capabilities of their own, however, they will receive some management information from charging station controller 92 as well. For example, each drone 18 has the ability to align itself with and enter drone charging station 10 and move up (or down) and finally exit from drone charging station. However, the drone 18 must wait for some indication from charging station controller 92 that it is safe to proceed.

Hybrid Drones' Intelligence is on the Cloud

Although in the hybrid scenario, some intelligence remains with drones 18, it is not necessary to mount a processor on drones 18. The drones 18 can be connected to a wireless communication network (e.g., Wi-Fi) in order to maintain an affordable and reliable connection with the charging station controller 92. Drones 18 can use the same wireless connection for sending all sensors data to the cloud (for example, at-the-edge or at-the-access in order to avoid unintended latency) and the data processing can be done on the cloud and the navigation commands can be produced and sent back to drone 18 for execution. In this fashion, manufacturing costs of the drones 18 will be significantly reduced. Furthermore, utilizing this approach, the capabilities of multiple drones 18 can be consolidated on a computing resource in the cloud by utilization of light weight container technologies, or any other virtualization technologies.

Hybrid at the Community Level

Although several embodiments of the present disclosure are designed for a household-oriented environment, where, for example, ownership is solely carried by the house or dwelling owner, it is possible to have a community-level scenario in which the multiple owners of drones 18 share a community station and its associated controller and logic.

Landed Operation

In this embodiment, drones 18 can land on drone charging station 10 and perform some of their tasks, for example, surveillance, even if the drones 18 are fully charged. This helps to avoid unnecessary use of energy in the drone's batteries and also to reduce the noise/collision probabilities.

Queue of Drones Approaching the Drone Charging Station

If several drones 18 need to be charged, the drones 18 to contact charging station controller 92 and then charging station controller 92 will sort all the requests based on different parameters such as amount of battery charge left for each drone 18 and their distance to drone charging station 10. The charging station controller 92 will then report back the sorted queue to each of the drones 18. The drones 18 can then form a queue on their approach drone charging station according to the sorted queue.

The present disclosure provides, in multiple embodiments, a drone charging station 10 configured to charge at least one drone 18. The drone charging station 10 includes at least one charging stack 15 comprised of a plurality of base blocks 12, each of the plurality of base blocks 12 sized to engage with the at least one drone 10. The at least one charging stack 15 includes a first conductor block 12*a* having a first polarity for electrically engaging with a corresponding first electrode 60 of the at least one drone 18, the first conductor block 12*a* having a first drone guiding portion 46; a second conductor block 12*b* having a second polarity different from the first polarity for electrically engaging with a corresponding second electrode 64 of the at least one drone 18, the second conductor block 12*b* having a second drone guiding portion 48; and an insulator block 12*c* positioned between the first conductor block 12*a* and the second conductor block 12*b*, the insulator block 12*c* having a third drone guiding portion 50. The first drone guiding portion 46, the second drone guiding portion 48 and the third drone guiding portion 50 being arranged to provide a drone guiding path 17 along the at least one charging stack 10.

In one embodiment of drone charging station 10 the first drone guiding portion 46 comprises a first thread, the second drone guiding portion 48 comprises a second thread, and the third drone guiding portion 50 comprises a third thread, and wherein the drone guiding path 17 comprises a continuous drone guiding thread formed by an arrangement of the first thread, the second thread and the third thread.

In one embodiment, the arrangement includes a starting point of the third thread being positioned proximate an ending point of the first thread and a starting point of the second thread being positioned proximate an ending point of the third thread.

In one embodiment, the first drone guiding portion 46 comprises a first plurality of pins, the second drone guiding portion 48 comprises a second plurality of pins, and the third drone guiding portion 50 comprises a third plurality of pins, and wherein the drone guiding path 17 is formed by an arrangement of the first plurality of pins, the second plurality of pins and the third plurality of pins.

In one embodiment, the drone charging station 10 is configured to charge a plurality of drones 18 at the same time.

In one embodiment, drone charging station 10 further includes an accessory block 78 having an end affixed to an end of one of the at least one charging stack 15, the accessory block 78 being tapered toward the end opposite the end affixed to the end of one of the at least one charging stack 15.

In one embodiment, the drone charging station 10 further includes a plurality of charging stacks 15 resulting in a plurality of first conductor blocks 12*a*, a plurality of second conductor blocks 12*b* and a plurality of insulator blocks 12*c*. The drone charging station 10 further includes an alignment element 52 configured to align each of the plurality of first conductor blocks 12*a*, second conductor blocks 12*b* and insulator blocks 12*c* to form a cylinder, a first conductor coupler 54, the first conductor coupler 54 electrically coupling each of the plurality of first conductor blocks 12*a* together, the first conductor coupler 54 being electrically conductive, and a second conductor coupler 56, the second conductor coupler 56 electrically coupling each of the plurality of second conductor blocks 12b together, the second conductor coupler 56 being electrically conductive.

In one embodiment, the drone charging station 10 further includes an insulator coupler 58, the insulator coupler 58 coupling each of the plurality of the insulator blocks 12c together.

In one embodiment, each of the plurality of first conductor blocks 12a, second conductor blocks 12b, and insulator blocks 12c include an alignment tab 40 extending within an interior of the cylinder, the alignment tab 40 including at least an alignment aperture 42 sized to receive the alignment element 52.

In one embodiment, each of the plurality of blocks 12 comprises a first end having a first engagement element and a second end having a second engagement element, the first end opposite the second end, wherein the first engagement element is matable with the second engagement element of an adjacent block 12 to prevent rotational misalignment.

In one embodiment, the drone guiding path 17 is formed along an exterior of the at least one charging stack 15.

In one embodiment, the drone charging station 10 further includes at least one insulator stack 12c, the at least one insulator stack comprising at least one insulator block 12c, the at least one insulator stack positioned between one of the at least one charging stack 15 and a second charging stack 15.

In one embodiment, the drone charging station further includes at least one motor configured to enable the at least one charging stack 15 to rotate and a rotation inhibitor 82 to inhibit rotation of the at least one drone 18 when the at least one drone 18 contacts the drone charging station 10, the at least one drone 10 traveling along the drone guiding path 17 due to the rotation of the at least one charging stack 15.

In one embodiment, the insulator block 12c comprises a plurality of separate insulator members.

In one embodiment, the drone charging station 10 further includes a third conductor block for electrically engaging with a corresponding electrode of the at least one drone 18, and a second insulator block positioned between one of the first conductor block 12a and the third conductor block and the second conductor block 12b and the third conductor block, third conductor block configured to provide data transmission to the at least one drone 18.

The present disclosure also provides, in one embodiment, a drone charging station 10 configured to charge at least one drone 18. The charging station 10 including at least one hollow charging tube 84 comprised of a plurality of interior blocks, each of the plurality of interior blocks sized to engage with the at least one drone 18. The at least one hollow charging tube 84 includes a first interior conductor block 86 having a first polarity for electrically engaging with a corresponding first electrode 60 of the at least one drone 18, the first interior conductor block 86 having a first drone guiding portion 87, a second interior conductor block 88 having a second polarity different from the first polarity for electrically engaging with a corresponding second electrode 64 of the at least one drone 18, the second interior conductor block 88 having a second drone guiding portion 89, and an interior insulator block 90 positioned between the first interior conductor block 86 and the second interior conductor block 88, the interior insulator block 90 having a third drone guiding portion 91. The first drone guiding portion 87, the second drone guiding portion 89 and the third drone guiding portion 91 being arranged to provide a drone guiding path along an interior of the at least one hollow charging tube.

In one embodiment, the first drone guiding portion 87 comprises a first thread, the second drone guiding portion 89 comprises a second thread, and the third drone guiding portion 91 comprises a third thread, and wherein the drone guiding path comprises a continuous drone guiding thread formed by an arrangement of the first thread, the second thread and the third thread.

In one embodiment, the arrangement includes a starting point of the third thread being positioned proximate an ending point of the first thread and a starting point of the second thread being positioned proximate an ending point of the third thread.

In one embodiment, the first drone guiding portion 87 comprises a first plurality of pins, the second drone guiding portion 89 comprises a second plurality of pins, and the third drone guiding portion 91 comprises a third plurality of pins, and wherein the drone guiding path is formed by an arrangement of the first plurality of pins, the second plurality of pins and the third plurality of pins.

In one embodiment, the drone charging station 10 is configured to charge a plurality of drones 18 at the same time.

In one embodiment, the drone charging station 10 further includes an accessory block 78 having an end affixed to an end of one of the at least one hollow charging tube 84, the accessory block 78 being tapered toward the end opposite the end affixed to the end of one of the at least hollow charging tube 84.

In one embodiment, the drone charging station 10 further includes a plurality of hollow charging tubes 84 resulting in a plurality of first interior conductor blocks 86, a plurality of second interior conductor blocks 88 and a plurality of interior insulator blocks 90. The drone charging station 10 further includes an alignment element 52 configured to align each of the plurality of first interior conductor blocks 86, second interior conductor blocks 88 and interior insulator blocks 90 to form a cylinder, a first conductor coupler, the first conductor coupler electrically coupling each of the plurality of first interior conductor blocks 88 together, the first conductor coupler being electrically conductive, and a second conductor coupler, the second conductor coupler electrically coupling each of the plurality of second interior conductor blocks 90 together, the second conductor coupler being electrically conductive.

In one embodiment, the drone charging station 10 further includes an insulator coupler, the insulator coupler coupling each of the plurality of interior insulator blocks 90 together.

In one embodiment, each of the plurality of first interior conductor blocks 88, second interior conductor blocks 90, and interior insulator blocks 90 include an alignment tab 40 extending outside of the cylinder, the alignment tab 40 including an aperture 42 sized to receive the alignment element 52.

In one embodiment, each of the plurality of blocks 86, 88, 90, comprises a first end having a first engagement element and a second end having a second engagement element, the first end opposite the second end, wherein the first engagement element is matable with the second engagement element of an adjacent block to prevent rotational misalignment.

In one embodiment, drone charging station 10 further includes at least one insulator layer, the at least one insulator layer comprising at least one insulator block, the at least one insulator layer positioned between one of the at least one charging hollow tube 84 and a second hollow charging tube 84.

In one embodiment, drone charging station 10 further includes at least one motor configured to enable the at least one hollow charging tube 84 to rotate, and a rotation inhibitor 82 to inhibit rotation of the at least one drone 18 when the at least one drone 18 enters the drone charging station 10, the at least one drone 18 traveling along the drone guiding path due to the rotation of the at least one hollow charging tube 84.

In another embodiment, a system for charging at least one drone 18 is provided. The system includes at least one drone 18, each of the at least one drone 18 including a first electrode 60 for electrically engaging with a corresponding first conductor block 12a in the drone charging station 10, the first electrode 60 including a first guiding region 66, a second electrode 64 for electrically engaging with a corresponding second conductor block 12b in the drone charging station 10, the second electrode 64 including a second guiding region 68, and an insulator 62, the insulator 62 including a third guiding region 67. The system further includes a guiding system comprising at least a portion of the first guiding region 66, the second guiding region 68, and the third guiding region 67, the guiding system configured to engage a corresponding guiding region of the drone charging station in order provide a drone guiding path 17 along the drone charging station 10.

In one embodiment, the first guiding region 66, the second guiding region 68, and the third guiding region 67 are recesses, each of the recesses configured to engage a corresponding thread of the drone charging station 10.

In one embodiment, the drone guiding path 17 is along an exterior of the drone charging station 10.

In one embodiment, each of the at least one drone 18 further includes a mounting aperture 28 configured to allow the at least one drone 18 to travel past a mounting arm 32 that affixes the drone charging station 10 to a surface.

In one embodiment, the at least one drone 18 includes a receiving region 28 sized to receive an outer perimeter of the drone charging station 10.

In one embodiment, the first guiding region 66, the second guiding region 68, and the third guiding region 67 are disposed within at least a portion of the receiving region 28.

In one embodiment, each of the at least one drone 18 is sized to fit within an interior of the drone charging station 10, and wherein the first electrode 60, the second electrode 64, and the insulator portion 62 are each disposed along an exterior region of the at least one drone 18, the drone guiding path 17 being formed along an interior surface of the drone charging station 10.

In another embodiment, a drone docking station configured to receive at least one drone is provided. The docking station includes a docking shaft sized to engage with the at least one drone 18, the docking shaft having a drone entrance end and a drone exit end opposite the drone entrance end, and a drone guiding thread helically encircling an exterior portion of the elongated docking shaft, the drone guiding thread configured to engage with a corresponding guiding region on the at least one drone 18 to allow the at least drone to move along the drone guiding thread from the drone entrance end to the drone exit end.

As will be appreciated by one of skill in the art, some of the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to block diagrams of methods, systems and computer program products. It will be understood that each block in the block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A drone charging station configured to charge at least one drone, the charging station comprising:
   at least one charging stack comprised of a plurality of base blocks, each of the plurality of base blocks sized to engage with the at least one drone, the at least one charging stack including:
      a first conductor block having a first polarity for electrically engaging with a corresponding first electrode of the at least one drone, the first conductor block having a first drone guiding portion;
      a second conductor block having a second polarity different from the first polarity for electrically engaging with a corresponding second electrode of the at least one drone, the second conductor block having a second drone guiding portion; and
      an insulator block positioned between the first conductor block and the second conductor block, the insulator block having a third drone guiding portion,
      the first drone guiding portion, the second drone guiding portion and the third drone guiding portion being arranged to provide a drone guiding path along the at least one charging stack.

2. The drone charging station of claim 1, wherein the first drone guiding portion comprises a first thread, the second drone guiding portion comprises a second thread, and the third drone guiding portion comprises a third thread, and wherein the drone guiding path comprises a continuous drone guiding thread formed by an arrangement of the first thread, the second thread and the third thread.

3. The drone charging station of claim 2, wherein the arrangement includes a starting point of the third thread being positioned proximate an ending point of the first thread and a starting point of the second thread being positioned proximate an ending point of the third thread.

4. The drone charging station of claim 1, wherein the first drone guiding portion comprises a first plurality of pins, the second drone guiding portion comprises a second plurality of pins, and the third drone guiding portion comprises a third plurality of pins, and wherein the drone guiding path is formed by an arrangement of the first plurality of pins, the second plurality of pins and the third plurality of pins.

5. The drone charging station of claim 1, wherein the drone charging station is configured to charge a plurality of drones at the same time.

6. The drone charging station of claim 1, further comprising an accessory block having an end affixed to an end of one of the at least one charging stack, the accessory block being tapered toward the end opposite the end affixed to the end of one of the at least one charging stack.

7. The drone charging station of claim 1, further comprising a plurality of charging stacks resulting in a plurality of first conductor blocks, a plurality of second conductor blocks and a plurality of insulator blocks, the drone charging station further comprising:
   an alignment element configured to align each of the plurality of first conductor blocks, second conductor blocks and insulator blocks to form a cylinder;
   a first conductor coupler, the first conductor coupler electrically coupling each of the plurality of first conductor blocks together, the first conductor coupler being electrically conductive; and
   a second conductor coupler, the second conductor coupler electrically coupling each of the plurality of second conductor blocks together, the second conductor coupler being electrically conductive.

8. The drone charging station of claim 7, further comprising an insulator coupler, the insulator coupler coupling each of the plurality of the insulator blocks together.

9. The drone charging station of claim 7, wherein each of the plurality of first conductor blocks, second conductor blocks, and insulator blocks include an alignment tab extending within an interior of the cylinder, the alignment tab including at least an alignment aperture sized to receive the alignment element.

10. The drone charging station of claim 7, wherein each of the plurality of blocks comprises a first end having a first engagement element and a second end having a second engagement element, the first end opposite the second end, wherein the first engagement element is matable with the second engagement element of an adjacent block to prevent rotational misalignment.

11. The drone charging station of claim 1, wherein the drone guiding path is formed along an exterior of the at least one charging stack.

12. The drone charging station of claim 1, further comprising at least one insulator stack, the at least one insulator stack comprising at least one insulator block, the at least one insulator stack positioned between one of the at least one charging stack and a second charging stack.

13. The drone charging station of claim 1, further comprising:
   at least one motor configured to enable the at least one charging stack to rotate; and
   a rotation inhibitor to inhibit rotation of the at least one drone when the at least one drone contacts the drone charging station, the at least one drone traveling along the drone guiding path due to the rotation of the at least one charging stack.

14. The drone charging station (10) of claim 1, wherein the insulator block (12c) comprises a plurality of separate insulator members.

15. The drone charging station of claim 1, further comprising:
   a third conductor block for electrically engaging with a corresponding electrode of the at least one drone; and
   a second insulator block positioned between one of the first conductor block and the third conductor block and the second conductor block and the third conductor block,
   the third conductor block configured to provide data transmission to the at least one drone.

16. A drone charging station configured to charge at least one drone, the charging station comprising:
   at least one hollow charging tube comprised of a plurality of interior blocks, each of the plurality of interior blocks sized to engage with the at least one drone, the at least one hollow charging tube including:

a first interior conductor block having a first polarity for electrically engaging with a corresponding first electrode of the at least one drone, the first interior conductor block having a first drone guiding portion;

a second interior conductor block having a second polarity different from the first polarity for electrically engaging with a corresponding second electrode of the at least one drone, the second interior conductor block having a second drone guiding portion; and an interior insulator block positioned between the first interior conductor block and the second interior conductor block, the interior insulator block having a third drone guiding portion, the first drone guiding portion, the second drone guiding portion and the third drone guiding portion being arranged to provide a drone guiding path along an interior of the at least one hollow charging tube.

17. The drone charging station of claim 16, wherein the first drone guiding portion comprises a first thread, the second drone guiding portion comprises a second thread, and the third drone guiding portion comprises a third thread, and wherein the drone guiding path comprises a continuous drone guiding thread formed by an arrangement of the first thread, the second thread and the third thread.

18. The drone charging station of claim 17, wherein the arrangement includes a starting point of the third thread being positioned proximate an ending point of the first thread and a starting point of the second thread being positioned proximate an ending point of the third thread.

19. The drone charging station of claim 16, wherein the first drone guiding portion comprises a first plurality of pins, the second drone guiding portion comprises a second plurality of pins, and the third drone guiding portion comprises a third plurality of pins, and wherein the drone guiding path is formed by an arrangement of the first plurality of pins, the second plurality of pins and the third plurality of pins.

20. The drone charging station of claim 16, wherein the drone charging station is configured to charge a plurality of drones at the same time.

21. The drone charging station of claim 16, further comprising an accessory block having an end affixed to an end of one of the at least one hollow charging tube, the accessory block being tapered toward the end opposite the end affixed to the end of one of the at least hollow charging tube.

22. The drone charging station of claim 16, further comprising a plurality of hollow charging tubes resulting in a plurality of first interior conductor blocks, a plurality of second interior conductor blocks and a plurality of interior insulator blocks, the drone charging station further comprising:

an alignment element configured to align each of the plurality of first interior conductor blocks, second interior conductor blocks and interior insulator blocks to form a cylinder;

a first conductor coupler, the first conductor coupler electrically coupling each of the plurality of first interior conductor blocks together, the first conductor coupler being electrically conductive; and a second conductor coupler, the second conductor coupler electrically coupling each of the plurality of second interior conductor blocks together, the second conductor coupler being electrically conductive.

23. The drone charging station of claim 22, further comprising an insulator coupler, the insulator coupler coupling each of the plurality of interior insulator blocks together.

24. The drone charging station of claim 22, wherein each of the plurality of first interior conductor blocks, second interior conductor blocks, and interior insulator blocks include an alignment tab extending outside of the cylinder, the alignment tab including an aperture sized to receive the alignment element.

25. The drone charging station of claim 22, wherein each of the plurality of blocks comprises a first end having a first engagement element and a second end having a second engagement element, the first end opposite the second end, wherein the first engagement element is matable with the second engagement element of an adjacent block to prevent rotational misalignment.

26. The drone charging station of claim 16, further comprising at least one insulator layer, the at least one insulator layer comprising at least one insulator block, the at least one insulator layer positioned between one of the at least one charging hollow tube and a second hollow charging tube.

27. The drone charging station of claim 16, further comprising:

at least one motor configured to enable the at least one hollow charging tube to rotate; and a rotation inhibitor to inhibit rotation of the at least one drone when the at least one drone enters the drone charging station, the at least one drone traveling along the drone guiding path due to the rotation of the at least one hollow charging tube.

28. A drone docking station configured to receive at least one drone, the docking station comprising:

a docking shaft sized to engage with the at least one drone, the docking shaft having a drone entrance end and a drone exit end opposite the drone entrance end; and a drone guiding thread helically encircling an exterior portion of the elongated docking shaft, the drone guiding thread configured to engage with a corresponding guiding region on the at least one drone to allow the at least one drone to move along the drone guiding thread from the drone entrance end to the drone exit end.

* * * * *